US012764778B2

(12) United States Patent
Axnäs et al.

(10) Patent No.: US 12,764,778 B2
(45) Date of Patent: Oct. 13, 2026

(54) COVERAGE ENHANCEMENT OF Msg3 AND MsgA TRANSMISSIONS ON PHYSICAL UPLINK SHARED CHANNEL

(71) Applicant: Telefonaktiebolaget LM Ericsson (publ), Stockholm (SE)

(72) Inventors: Johan Axnäs, Solna (SE); Robert Mark Harrison, Grapevine, TX (US); Ling Su, Beijing (CN); Zhipeng Lin, Nanjing (CN); David Astely, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 490 days.

(21) Appl. No.: 18/018,288

(22) PCT Filed: Aug. 4, 2021

(86) PCT No.: PCT/IB2021/057159
§ 371 (c)(1),
(2) Date: Jan. 27, 2023

(87) PCT Pub. No.: WO2022/029652
PCT Pub. Date: Feb. 10, 2022

(65) Prior Publication Data

US 2023/0262753 A1 Aug. 17, 2023

(30) Foreign Application Priority Data

Aug. 4, 2020 (WO) ................ PCT/CN2020/106760

(51) Int. Cl.
*H04W 74/08* (2024.01)
*H04L 1/1822* (2023.01)
(Continued)

(52) U.S. Cl.
CPC ......... *H04W 74/002* (2013.01); *H04L 1/1822* (2013.01); *H04W 72/02* (2013.01);
(Continued)

(58) Field of Classification Search
CPC ............... H04W 74/002; H04W 72/02; H04W 74/0833; H04W 74/0836; H04W 74/004;
(Continued)

(56) References Cited

U.S. PATENT DOCUMENTS

2016/0100431 A1 4/2016 Kshiyama et al.
2016/0270038 A1 9/2016 Papasakellariou
(Continued)

FOREIGN PATENT DOCUMENTS

CN 109413745 A 3/2019
CN 109769303 A 5/2019
(Continued)

OTHER PUBLICATIONS

International Search Report and Written Opinion of the International Searching Authority for PCT International Application No. PCT/IB2021/057159 dated Nov. 17, 2021.
(Continued)

*Primary Examiner* — Jayanti K Patel
(74) *Attorney, Agent, or Firm* — Sage Patent Group

(57) ABSTRACT

A communication device operating in a communications network can determine to transmit information using repetition to a network node operating in the communications network during a random access, RA, procedure. The communication device can further determine a subset of preambles based on determining to transmit the information using repetition. Responsive to determining the subset of preambles, the communication device can determine a preamble of the subset of preambles to transmit to the network node to indicate a type of the repetition. The communication
(Continued)

device can further transmit the preamble to the network node. The communication device can further transmit the information using the type of repetition to the network node.

22 Claims, 17 Drawing Sheets

(51) Int. Cl.

| | |
|---|---|
| ***H04W 72/02*** | (2009.01) |
| ***H04W 74/00*** | (2009.01) |
| ***H04W 74/0833*** | (2024.01) |
| *H04L 1/1812* | (2023.01) |
| *H04W 74/0836* | (2024.01) |

(52) U.S. Cl.
CPC ....... *H04W 74/0833* (2013.01); *H04L 1/1812* (2013.01); *H04W 74/0836* (2024.01)

(58) Field of Classification Search
CPC .. H04W 74/006; H04W 56/00; H04L 1/1822; H04L 1/1812; H04L 1/08; H04L 1/189; H04L 1/1896; H04L 5/0048
See application file for complete search history.

(56) References Cited

U.S. PATENT DOCUMENTS

| | | | |
|---|---|---|---|
| 2016/0302234 | A1 | 10/2016 | Martinez Tarradell et al. |
| 2017/0280481 | A1 | 9/2017 | Stern-Berkowitz et al. |
| 2018/0103465 | A1 | 4/2018 | Agiwal et al. |
| 2018/0152924 | A1 | 5/2018 | Ouchi |
| 2019/0037569 | A1 | 1/2019 | Lee et al. |
| 2020/0100297 | A1 | 3/2020 | Agiwal et al. |
| 2020/0120709 | A1 | 4/2020 | Bergquist et al. |
| 2020/0221505 | A1 | 7/2020 | Agiwal et al. |
| 2020/0359425 | A1 | 11/2020 | Chen et al. |
| 2020/0396774 | A1* | 12/2020 | Thota .................. H04L 27/2613 |
| 2021/0045159 | A1* | 2/2021 | Lei .................... H04W 74/0833 |
| 2021/0100034 | A1* | 4/2021 | Turtinen ........... H04W 74/0833 |
| 2021/0105851 | A1* | 4/2021 | Kim ...................... H04W 76/27 |
| 2021/0136810 | A1* | 5/2021 | Kung ................... H04B 7/0626 |
| 2021/0136818 | A1* | 5/2021 | Deogun ............ H04W 74/0833 |
| 2021/0136825 | A1* | 5/2021 | Ly ..................... H04W 74/0816 |
| 2021/0360660 | A1* | 11/2021 | Cozzo ................... H04L 1/1887 |
| 2023/0058265 | A1* | 2/2023 | Yao ....................... H04L 1/1893 |

FOREIGN PATENT DOCUMENTS

| | | | |
|---|---|---|---|
| CO | 20210001677 | A2 | 2/2021 |
| JP | 2014220662 | A | 11/2014 |
| WO | 2016186044 | A1 | 11/2016 |
| WO | 2020067967 | A1 | 4/2020 |
| WO | 2020147071 | A1 | 7/2020 |

OTHER PUBLICATIONS

Samsung, "Considerations on potential techniques for coverage enhancement," R1-2003916, 3GPP TSG RAN WG1 #101-e, e-Meeting, May 25-Jun. 5, 2020, 6 pages.
Vivo, "Discussion on potential techniques for coverage enhancements," R1-2003437, 3GPP TSG RAN WG1 #101, e-Meeting, May 25-Jun. 5, 2020, 9 pages.
Ericsson, "Msg3/Msg4 transmission for MTC", 3GPP TSG RAN WG1 Meeting #82bis, Malmö, Sweden, Oct. 5-9, 2015, pp. 1-4, R1-155040, 3GPP.
R1-1708741, NEC Correction on reference table for the repetition number field in DCI Fonnat 0C 3GPP TSG RAN WG1 Meeting #89, May 19, 2017 (May 19, 2017).
R1-2000902, Motorola Mobility et al. Frequency hopping in PUSCH repetition 3GPP TSG RAN WG1 Meeting #100-e Mar. 6, 2020 (Mar. 6, 2020).
ZTE et al., "Remaining issues on UL HARQ-ACK feedback for MTC", 3GPP TSG RAN WG1 Meeting #91, Reno, USA, Nov. 27-Dec. 1, 2017, pp. 1-5, R1-1719712, 3GPP.
First Examination Report mailed Jul. 1, 2024 for Indian Patent Application No. 202317009519, 5 pages.
Intel Corporation, "Coverage enhancements for PUSCH", 3GPP TSG RAN WG1 Meeting #82, Beijing, China, Aug. 24-28, 2015, 9 pages.
Huawei, HiSilicon, "Summary of informal email discussion for 'Physical layer aspects of random access transmission", 3GPP TSG RAN WG1 Meeting #83, Anaheim, USA, Nov. 15-22, 2015, 43 pages.
Ericsson, "Remaining Details in UL Transmission Procedures", 3GPP TSG RAN WG1 Meeting #92, R1-1802913, Athens, Greece, Feb. 26-Mar. 2, 3018, 9 pages. Aug. 14, 2026.
Ericsson, "Solutions to Coverage Issues for Msg3 Transmissions", 3GPP TSG-RAN WG2 #102, R2-1807028, Busan, Republic of Korea, May 21-25, 2018, 4 pages. Aug. 14, 2026.

* cited by examiner

| TB Scaling Field | Scaling Factor S |
|---|---|
| 00 | 1 |
| 01 | 0.5 |
| 10 | 0.25 |
| 11 | 0.125 |

FIG. 9

| TB Scaling Field | Scaling Factor S |
|---|---|
| 0 | .5 |
| 1 | .25 |

FIG. 10

| UE | N | j | k | m | DMRS Index |
|---|---|---|---|---|---|
| 1 | 2 | 0 | 0 | 0 | 0 |
| 2 | 4 | 1 | 1 | 0 | 1 |
| 3 | 1 | 2 | 2 | 2 | 2 |
| 4 | 2 | 3 | 1 | 2 | 3 |
| 5 | 1 | 4 | 0 | 0 | 4 |

FIG. 11

COVERAGE ENHANCEMENT OF Msg3 AND MsgA TRANSMISSIONS ON PHYSICAL UPLINK SHARED CHANNEL

CROSS REFERENCE TO RELATED APPLICATIONS

This application is a 35 U.S.C. § 371 national stage application of PCT International Application No. PCT/IB2021/057159 filed on Aug. 4, 2021, which itself is a continuation of PCT International Application No. PCT/CN2020/106760, filed Aug. 4, 2020, the disclosures and contents of which are incorporated by reference herein in their entireties.

TECHNICAL FIELD

The present disclosure is related to wireless communication systems and more particularly to coverage enhancement of Msg3 and MsgA transmissions on physical uplink shared channel ("PUSCH").

BACKGROUND

FIG. 1 illustrates an example of a $5^{th}$ Generation ("5G") network including a network node 102 (e.g., a 5G base station ("gNB")) and multiple communication devices 104 (also referred to as user equipment ("UE")).

A random access ("RA") procedure is defined by the $3^{rd}$ Generation Partnership Project ("3GPP") new radio ("NR") Release-15 and is used for connecting a UE to a network. FIGS. 2-3 illustrate examples of a four-step RA procedure. Initially, the network node 102 can transmit DL data via a SS/PBCH block as well as broadcast system information. Then, four sets of messages are communicated between the UE 102 and the network node 104: Message 1 ("Msg1"), Message 2 ("Msg2"), Message 3 ("Msg3"), and Message 4 ("Msg4"). Msg1 is an uplink transmission from the UE 102 the network node 104 and includes a physical random access channel ("PRACH") preamble. Msg2 is a downlink transmission from the network node 104 to the UE 102 and includes a random access response ("RAR"). Msg3 is an uplink transmission and includes physical uplink shared channel ("PUSCH") transmission of, for example, UE identity information. This message is scheduled using a physical downlink control channel ("PDCCH"). Msg4 is a downlink transmission and includes a contention resolution message ("CRM"). After this procedure is completed, the UE is connected to the network.

A similar procedure is can be used in other situations (e.g., handover of an already connected UE). When used for the initial connection of a UE, the procedure can be referred to as initial access procedure.

SUMMARY

According to some embodiments, a method of operating a communication device in a communications network is provided. The method includes receiving a random access response, RAR, from a network node in the communications network during a random access, RA, procedure. The RAR can include a single indicator that jointly indicates whether to transmit information to the network node using repetition and frequency hopping. The method further includes determining to transmit the information using repetition and frequency hopping based on the single indicator. The method further includes, responsive to determining to transmit the information using repetition and frequency hopping, transmitting the information to the network node.

According to other embodiments, a method of operating a communication device in a communications network is provided. The method can include receiving a fallback random access response, RAR, from a network node in the communications network during a two-step random access, RA, procedure. The fallback RAR can indicate a switch to a four-step RA procedure. The method can further include, responsive to receiving the fallback RAR, determining to transmit Msg3 using repetition based on receiving the fallback RAR. The method can further include, responsive to determining to transmit the information using repetition, transmitting Msg3 to the network node using repetition.

According to other embodiments, a method of operating a communication device in a communications network is provided. The method can include determining to transmit information using repetition to a network node operating in the communications network during a random access, RA, procedure. The method can further include determining a subset of preambles based on determining to transmit the information using a type of repetition. The method can further include, responsive to determining the subset of preambles, determining a preamble of the subset of preambles to transmit to the network node to indicate the type of the repetition. The method can further include transmitting the preamble to the network node. The method can further include transmitting the information using the type of repetition to the network node.

According to other embodiments, a method of operating a communication device in a communications network is provided. The method can include receiving a system information block, SIB, from a network node operating in the communications network. The SIB can include an indication indicating to transmit Msg3 using repetition during a random access, RA, procedure according to a radio access stratum release. The method can further include transmitting a RA preamble to the network node to initiate the RA procedure. The method can further include receiving a random access response, RAR, from the network node. The method can further include, responsive to receiving the RAR, transmitting the Msg3 using repetition based on the indication.

According to other embodiments, a method of operating a network node in a communications network is provided. The method can include transmitting a random access response, RAR, to a communication device in the communications network during a random access, RA, procedure. The RAR can include a single indicator to jointly indicate to the communication device to transmit information to the network node using repetition and frequency hopping. The method can further include, responsive to transmitting the RAR, repeatedly receiving the information from the communication device using multiple sets of frequency resources.

According to other embodiments, a method of operating a network node in a communications network is provided. The method can include receiving a preamble from a communication device during a random access, RA, procedure. The method can further include determining whether the communication device will transmit information using repetition based on a subset of preambles associated with the preamble. The method can further include receiving the information from the communication device.

According to other embodiments, a method of operating a network node in a communications network is provided. The method can include transmitting a system information block, SIB, to a communication device operating in the communications network. The SIB can include an indication indicating to transmit Msg3 using repetition during a revised random access, RA procedure that is associated with a first radio access stratum release. The method can further include receiving a RA preamble from the communication device initiating the revised RA procedure. The method can further include transmitting a random access response, RAR, to the communication device. The RAR can be usable by communication devices associated with a second release that is different than the first release. The method can further include receiving the Msg3 from the communication device.

According to other embodiments, a communication device, a network node, computer program, and/or computer program product is provided for performing one or more of the above methods.

In various embodiments described herein, Msg3 and MsgA coverage is improved using repetition and/or frequency hopping. Since Msg3 is a potential coverage performance bottleneck, this can improve the overall NR coverage performance.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 9-10 are table illustrating examples of scaling factors for transmission block size determination in accordance with some embodiments;

FIG. 11 is a table illustrating example or resource selection calculation in accordance with some embodiments;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
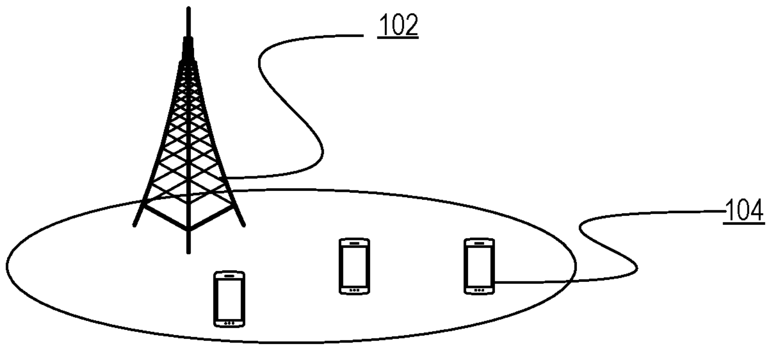
FIG. 1 is a schematic diagram illustrating an example of a 5th generation ("5G") network.
Figure 2:
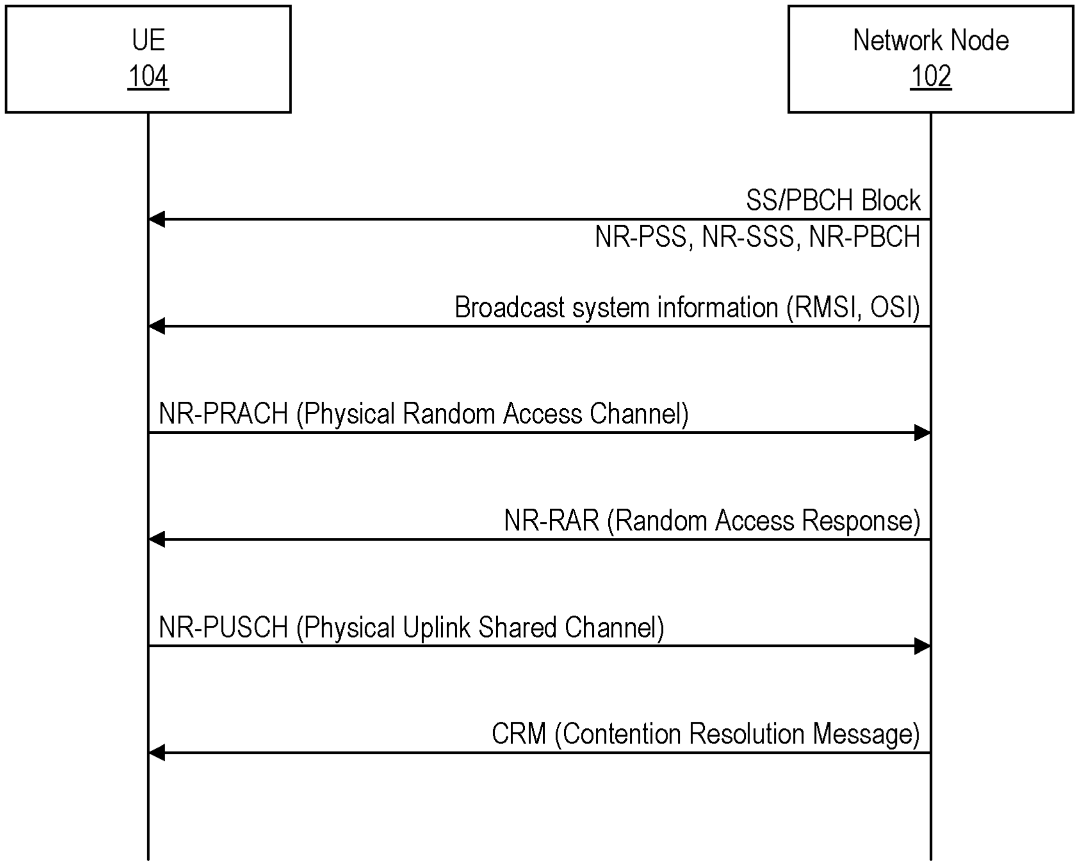
FIG. 2 is a signal flow diagram illustrating an example of a random access procedure used for connecting a UE to a network.
Figure 3:
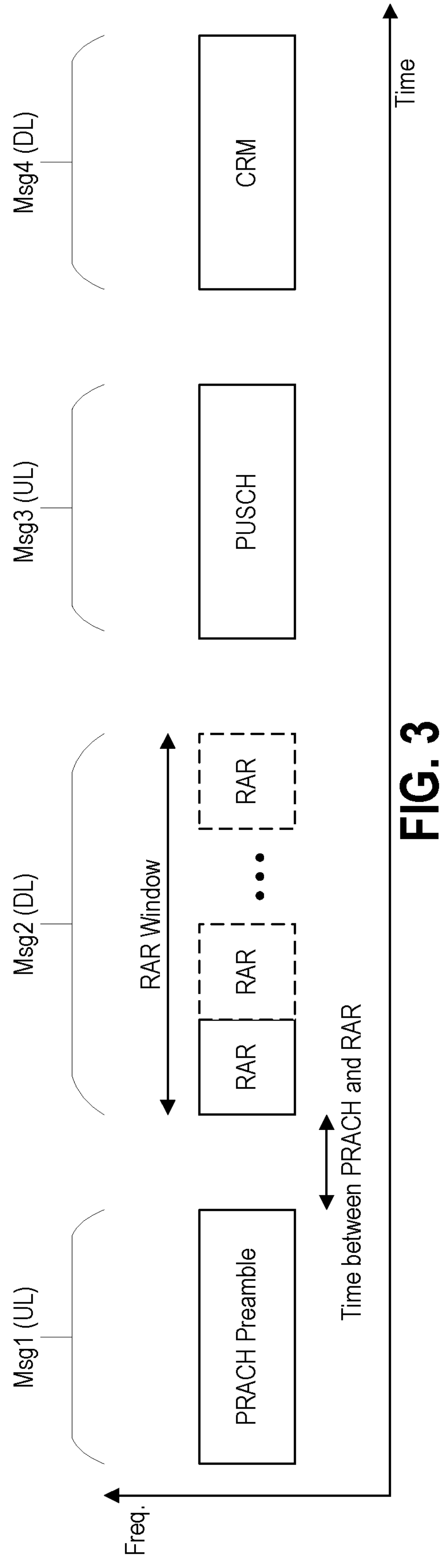
FIG. 3 is a schematic diagram illustrating an example of a 4-step random access procedure.
Figure 4:
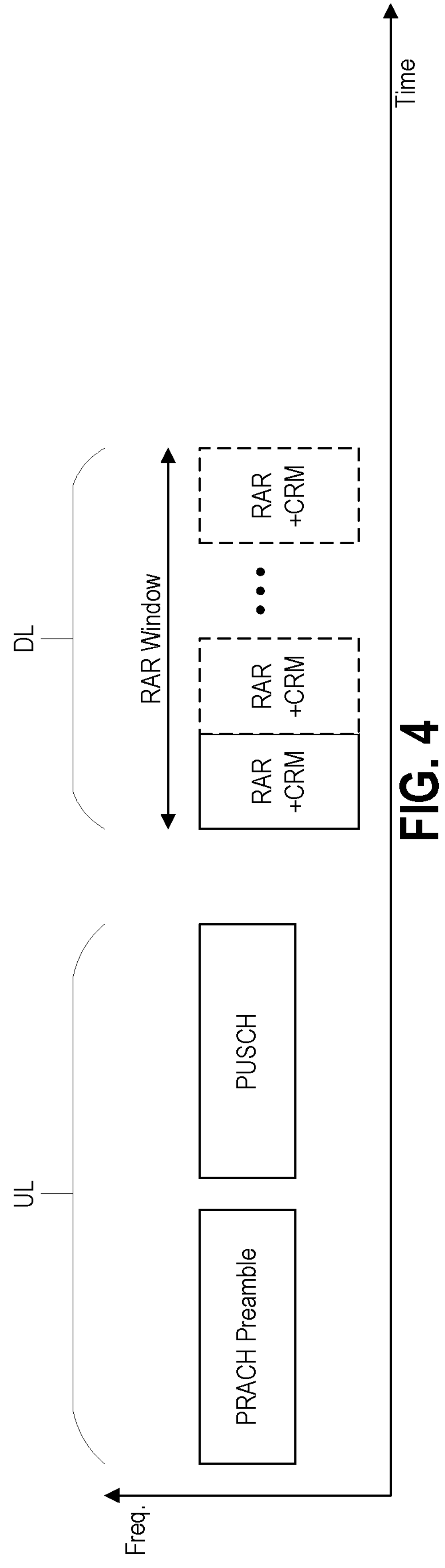
FIG. 4 is a schematic diagram illustrating an example of a 2-step random access procedure.

FIG. 3 illustrates an example of a two-step random access, RA, procedure as introduced in release 16 of the 3rd Generation Partnership Project ("3GPP") new radio ("NR") standard. In this example, the two uplink messages of the four-step RA (Msg1 and Msg3) are combined into a single uplink message (referred to as MsgA), while the two downlink messages (Msg2/RAR and Msg4/CRM) are combined into a single downlink message (referred to as MsgB). The two-step RA procedure can be useful for latency reduction.

Frequency hopping ("FH") is a physical uplink shared channel ("PUSCH") feature. Frequency hopping means that a PUSCH transmission uses one set of frequency resources (e.g., subcarriers/physical resource blocks ("PRBs")) for one part of the transmission, and another set of frequency resources for another part of the transmission. In the case of intra-slot FH, one set of frequency resources can be used for part of a slot and another set of frequency resources can be used for another part of the same slot. The advantage of FH is increased frequency diversity, which can lead to improved performance.

Preamble group selection is described below.

It can be helpful for the network to have some rough estimate of the channel conditions that the UE experiences and the available power the UE has to transmit random access messages as early as possible when radio links are being set up. In some examples, the UE can select a random access preamble group based on Msg3 size, logical channel, and pathloss. The group that the UE selects its preamble from can thereby provide an estimate of whether the UE has sufficient power to transmit Msg3. The preamble group selection can be based on the configuration of Random Access Preambles group B, and ra-Msg3SizeGroupA:

```
2>  else if Msg3 buffer is empty:
    3>  if Random Access Preambles group B is configured:
        4>  if the potential Msg3 size (UL data available for
transmission plus MAC header and, where required, MAC CEs) is greater than ra-
Msg3SizeGroupA and the pathloss is less than PCMAX (of the Serving Cell
performing the Random Access Procedure) - preambleReceivedTargetPower -
msg3-DeltaPreamble - messagePowerOffsetGroupB; or
        4>  if the Random Access procedure was initiated for the
CCCH logical channel and the CCCH SDU size plus MAC subheader is greater
than ra-Msg3SizeGroupA:
            5>  select the Random Access Preambles group B.
        4>  else:
            5>  select the Random Access Preambles group A.
    3>  else:
        4>  select the Random Access Preambles group A.
2>  else (i.e. Msg3 is being retransmitted):
    3>  select the same group of Random Access Preambles as was
used for the Random Access Preamble transmission attempt corresponding to the
first transmission of Msg3.
```

Where the parameters groupBconfigured (indicating if Random Access Preambles group B is configured) and ra-Msg3SizeGroupA are given in RACH-ConfigCommon while preambleReceivedTargetPower is found in RACH-ConfigGeneric.

PUSCH power control is described below.

PUSCH transmission, including transmission for Msg3, can be subject to uplink power control. In some examples, the UE can transmit no more than a maximum configured power $P_{CMAX,f,c}(i)$ for a PUSCH transmission occasionion carrier f of serving cell c.

If a UE transmits a PUSCH on active UL BWP, b, of carrier, f, of serving cell, c, using parameter set configuration with index, j, and PUSCH power control adjustment state with index, I, the UE determines the PUSCH transmission power $P_{PUSCH,\ b,\ f,\ c}(i,\ j,\ q_d,\ l)$ in PUSCH transmission occasion, i, as $$P_{PUSCH,b,f,c}(i, j, q_d, l) = \min\left\{\begin{matrix} P_{CMAX,f,c}(i), \\ P_{O\_PUSCH,b,f,c}(j) + 10\log_{10}\left(2^{\mu}\cdot M_{RB,b,f,c}^{PUSCH}(i)\right) + \alpha_{b,f,c}(j)\cdot \\ PL_{b,f,c}(q_d) + \Delta_{TF,b,f,c}(i) + f_{b,f,c}(i, l) \end{matrix}\right\}\text{dBm}$$

where, $P_{CMAX,f,c}(i)$ is the UE configured maximum output power for carrier, f, of serving cell, c, in PUSH transmission occasion, i.

Uplink ("UL") grant in RAR in long term evolution ("LTE") is described below.

In LTE, The uplink grant field in RAR, also referred to as random access response grant field, indicates the resources to be used on the uplink. The size of the UL Grant field is 20 bits for UEs that do not have restricted bandwidth or coverage extension capability ('Non-BL/CE UEs'). The content of these 20 bits starting with the MSB and ending with the LSB are as follows. It may be observed that the RAR indicates a number of Msg3 repetitions. Hopping flag—1 bit. Fixed size resource block assignment—10 bits. Truncated modulation and coding scheme—4 bits. If a UE is configured with a higher layer parameter pusch-EnhancementsConfig, then Repetition number of Msg3—3 bits, else TPC command for scheduled PUSCH—3 bits. UL delay—1 bit CSI request—1 bit For NB-IoT UEs, the size of UL grant field is 15 bits, and for BL UEs and UEs in enhanced coverage level 2 or 3, the size of the UL grant field is 12 bits.

One of the messages in the RA procedure, Msg3, has turned out to be a potential performance bottleneck in NR networks and it is therefore of interest to improve coverage of this message. Although performance can be improved by performing multiple HARQ retransmissions, this generally complicates the procedure, requiring the network to retransmit both Msg2 and grants for TC-RNTI, thereby adding substantial extra PDCCH overhead and latency.

Various embodiments described herein provide techniques for Msg3 and MsgA coverage enhancement. In some embodiments, Msg3 is transmitted using repetition and frequency hopping. In additional or alternative embodiments, Msg3 is transmitted using repetition which is communicated between the network node and the UE. In additional or alternative embodiments, Msg3 is transmitted using repetition which is determined by the UE.

In some embodiments, ideas for Msg3 and MsgA coverage enhancement that are not directly related to repetition are also described, for example, conditional Msg3 and MsgA frequency hopping (FH) and TB scaling of Msg3 PUSCH.

Figure 13:
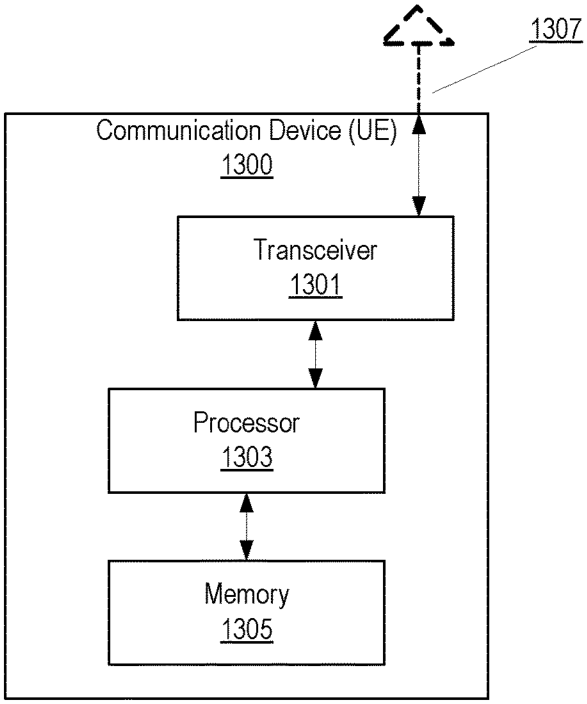
FIG. 13 is a block diagram illustrating an example of a communication device in accordance with some embodiments.

FIG. 13 is a block diagram illustrating elements of a communication device 1300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. (Communication device 1300 may be provided, for example, as discussed below with respect to wireless device 4110 of FIG. 23.) As shown, communication device 1300 may include an antenna 1307 (e.g., corresponding to antenna 4111 of FIG. 23), and transceiver circuitry 1301 (also referred to as a transceiver, e.g., corresponding to interface 4114 of FIG. 23) including a transmitter and a receiver configured to provide uplink and downlink radio communications with a base station(s) (e.g., corresponding to network node 4160 of FIG. 23, also referred to as a RAN node) of a radio access network.

Figure 23:
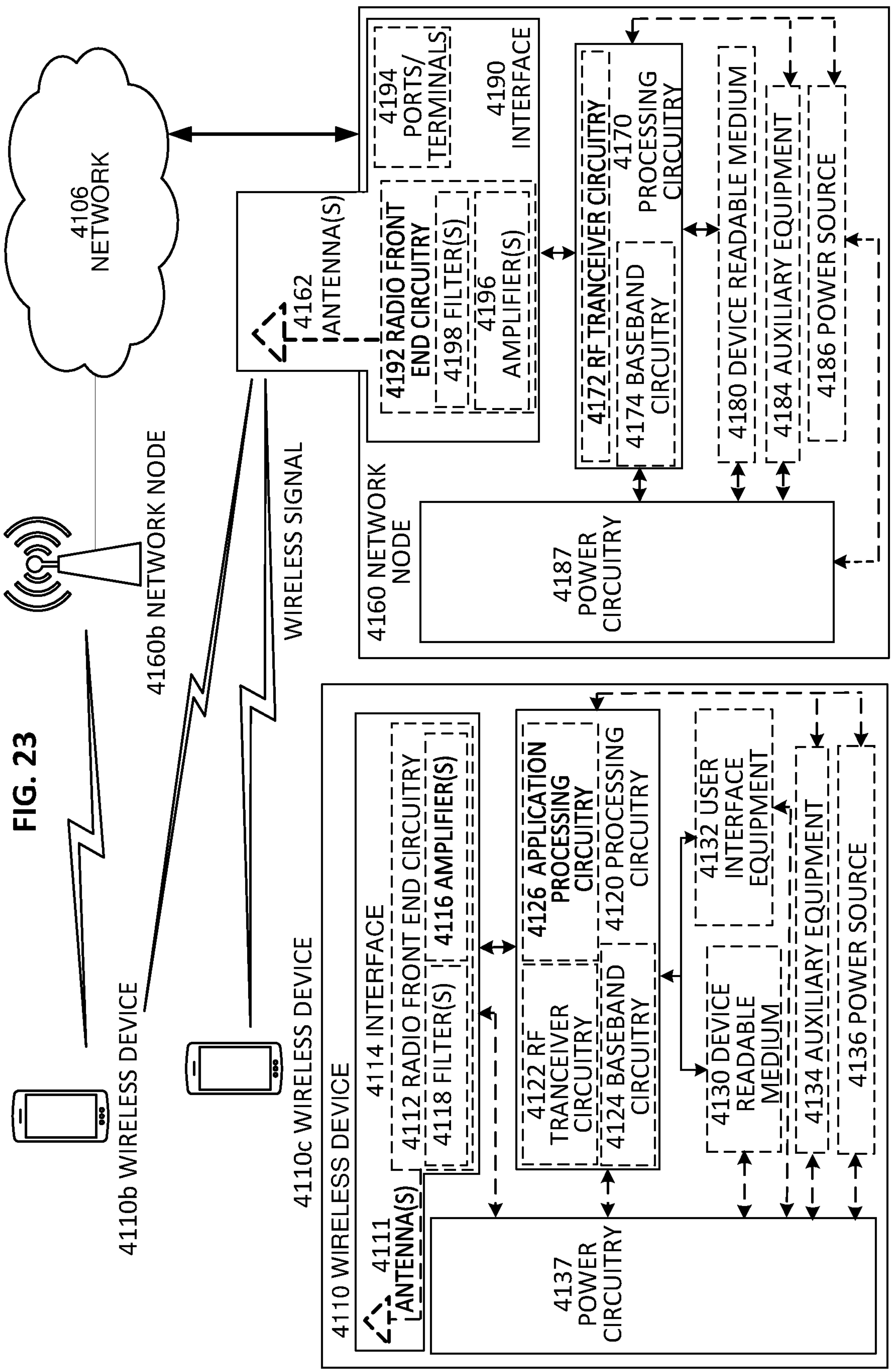
FIG. 23 is a block diagram of a wireless network in accordance with some embodiments.

Communication device 1300 may also include processing circuitry 1303 (also referred to as a processor, e.g., corresponding to processing circuitry 4120 of FIG. 23) coupled to the transceiver circuitry, and memory circuitry 1305 (also referred to as memory, e.g., corresponding to device readable medium 4130 of FIG. 23) coupled to the processing circuitry. The memory circuitry 1305 may include computer readable program code that when executed by the processing circuitry 1303 causes the processing circuitry to perform operations according to embodiments disclosed herein. According to other embodiments, processing circuitry 1303 may be defined to include memory so that separate memory circuitry is not required. Communication device 1300 may also include an interface (such as a user interface) coupled with processing circuitry 1303, and/or communication device UE may be incorporated in a vehicle.

As discussed herein, operations of communication device 1300 may be performed by processing circuitry 1303 and/or transceiver circuitry 1301. For example, processing circuitry 1303 may control transceiver circuitry 1301 to transmit communications through transceiver circuitry 1301 over a radio interface to a radio access network node (also referred to as a base station) and/or to receive communications through transceiver circuitry 1301 from a RAN node over a radio interface. Moreover, modules may be stored in memory circuitry 1305, and these modules may provide instructions so that when instructions of a module are executed by processing circuitry 1303, processing circuitry 1303 performs respective operations.

Figure 14:
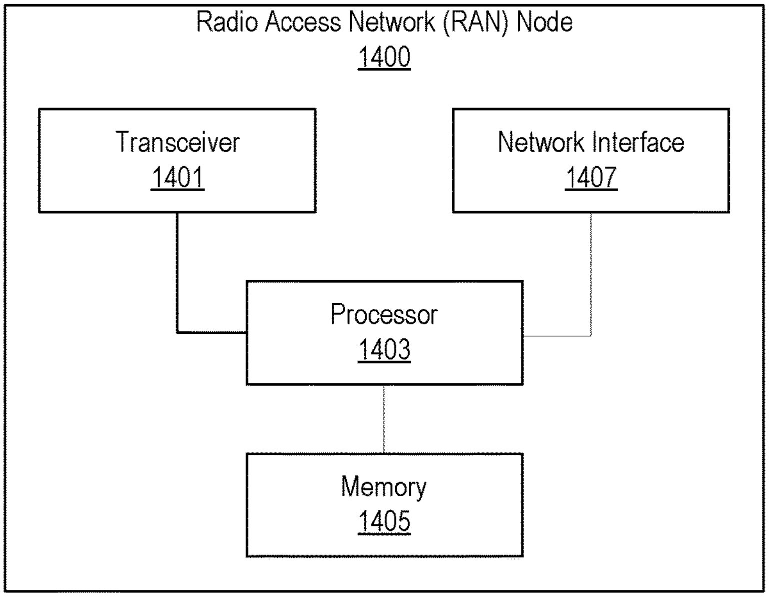
FIG. 14 is a block diagram illustrating an example of a radio access network ("RAN") node in accordance with some embodiments.

FIG. 14 is a block diagram illustrating elements of a radio access network ("RAN") node 1400 (also referred to as a network node, base station, eNodeB/eNB, gNodeB/gNB, etc.) of a Radio Access Network (RAN) configured to provide cellular communication according to embodiments of inventive concepts. (RAN node 1400 may be provided, for example, as discussed below with respect to network node 4160 of FIG. 23.) As shown, the RAN node 1400 may include transceiver circuitry 1401 (also referred to as a transceiver, e.g., corresponding to portions of interface 4190 of FIG. 23) including a transmitter and a receiver configured to provide uplink and downlink radio communications with mobile terminals. The RAN node 1400 may include network interface circuitry 1407 (also referred to as a network interface, e.g., corresponding to portions of interface 4190 of FIG. 23) configured to provide communications with other nodes (e.g., with other base stations) of the RAN and/or core network CN. The RAN node 1400 may also include processing circuitry 1403 (also referred to as a processor, e.g., corresponding to processing circuitry 4170) coupled to the transceiver circuitry, and memory circuitry 1405 (also referred to as memory, e.g., corresponding to device readable medium 4180 of FIG. 23) coupled to the processing circuitry. The memory circuitry 1405 may include computer readable program code that when executed by the processing circuitry 1403 causes the processing circuitry to perform operations according to embodiments disclosed herein. According to other embodiments, processing circuitry 1403 may be defined to include memory so that a separate memory circuitry is not required.

As discussed herein, operations of the RAN node 1400 may be performed by processing circuitry 1403, network interface 1407, and/or transceiver 1401. For example, processing circuitry 1403 may control transceiver 1401 to transmit downlink communications through transceiver 1401 over a radio interface to one or more mobile terminals UEs and/or to receive uplink communications through transceiver 1401 from one or more mobile terminals UEs over a radio interface. Similarly, processing circuitry 1403 may control network interface 1407 to transmit communications through network interface 1407 to one or more other network nodes and/or to receive communications through network interface from one or more other network nodes. Moreover, modules may be stored in memory 1405, and these modules may provide instructions so that when instructions of a module are executed by processing circuitry 1403, processing circuitry 1403 performs respective operations (e.g., operations discussed below with respect to Example Embodiments relating to network nodes).

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 15:
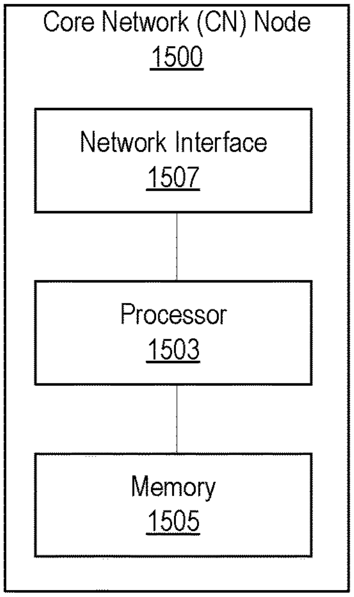
FIG. 15 is a block diagram illustrating an example of a core network ("ON") node in accordance with some embodiments.

FIG. 15 is a block diagram illustrating elements of a core network ("CN") node 1500 (e.g., an SMF node, an AMF node, an AUSF node, a UDM node, etc.) of a communication network configured to provide cellular communication according to embodiments of inventive concepts. As shown, the CN node 1500 may include network interface circuitry 1507 (also referred to as a network interface) configured to provide communications with other nodes of the core network and/or the RAN. The CN node 1500 may also include a processing circuitry 1503 (also referred to as a processor) coupled to the network interface circuitry, and memory circuitry 1505 (also referred to as memory) coupled to the processing circuitry. The memory circuitry 1505 may include computer readable program code that when executed by the processing circuitry 1503 causes the processing circuitry to perform operations according to embodiments disclosed herein. According to other embodiments, processing circuitry 1503 may be defined to include memory so that a separate memory circuitry is not required.

As discussed herein, operations of the CN node 1500 may be performed by processing circuitry 1503 and/or network interface circuitry 1507. For example, processing circuitry 1503 may control network interface circuitry 1507 to transmit communications through network interface circuitry 1507 to one or more other network nodes and/or to receive communications through network interface circuitry from one or more other network nodes. Moreover, modules may be stored in memory 1505, and these modules may provide instructions so that when instructions of a module are executed by processing circuitry 1503, processing circuitry 1503 performs respective operations.

In some embodiments, repetition and/or frequency hopping is used for Msg3 or MsgA PUSCH.

Some intra-slot FH embodiments are described below.

In some embodiments, support for FH is introduced for Msg3 PUSCH with some additional functionality. In some examples, the (dynamic) transmission parameters for Msg3 can be signaled to the UE in the form of an UL RAR grant in Msg2. In the UL grant there is a frequency hopping flag field with length of one (1) bit. To keep the same RAR grant size, this bit could be used to dynamically indicate a combination of both slot aggregation and frequency hopping. In the system information, the number of repetitions to be used when frequency hopping is used could be provided.

In additional or alternative examples, how many repetitions should be used when there is no frequency hopping can also be indicated.

In some embodiments, the network can have two options: 1) no frequency hopping and no repetitions; or 2) frequency hopping and N repetitions. Other combinations are possible. However, in this example, the single bit allows the network to signal to the UE, perhaps based on measurements on the received PRACH, which of the two Msg3 configurations should be used.

In additional or alternative embodiments, configuration of the Msg3 can be signaled using some of the 16 reserved bits in the DCI format 1_0 for the case that the CRC scrambling is done with the RA-RNTI. This means that a DL assignment would carry information that is relevant for the next UL transmission, be it on PUCCH or in this case PUSCH. In the downlink one could indicate also how repetition factor for the PUCCH is in the uplink. Thus, the number of PUSCH repetitions (or equivalently the PUSCH aggregation level) can be signaled on the PDCCH carrying the Msg2.

Some inter-slot FH embodiments are described below.

In some examples, intra-slot FH can reduce the amount of filtering (averaging) of the channel estimate in time that can be performed (since such filtering is normally not possible when different frequency-domain resources are used). The reduced filtering can have a negative impact on performance.

In some embodiments, a single frequency within a slot can be used and the frequency hops can be made in between slots. If each repetition occupies only a single slot, this means frequency hopping can occur between repetitions. However, if one repetition spans multiple slots, the frequency hopping may be inter-slot but still within a repetition.

At low speed, inter-slot FH can provide a similar gain as intra-slot FH, at least as long as the total number of different frequencies is the same. However, an advantage of inter-slot FH is that it could yield better channel estimation performance based on allowing channel filtering (averaging) in time domain over a larger duration (a whole slot instead just part of a slot).

In additional or alternative embodiments, Msg3 may be configured to sometimes let two or more consecutive slots use the same frequency, thereby allowing for an even larger degree of channel filtering in time domain. For example, the UE can, based on specifications and/or network configuration, transmit N1 consecutive slots on the same set of frequency resources, and then change to a second set of frequency resources for N2 consecutive slots, etc. The numbers N1, N2 may all be equal and, for example, configured through a single parameter or can be different. The frequency resources may be different for each set of N1 consecutive slots (in order to maximize diversity and thereby performance), or they may be the same for some of the sets of N1 consecutive slots (e.g. to reduce the amount of signaling needed or simplify scheduling of other channels).

Figure 5:
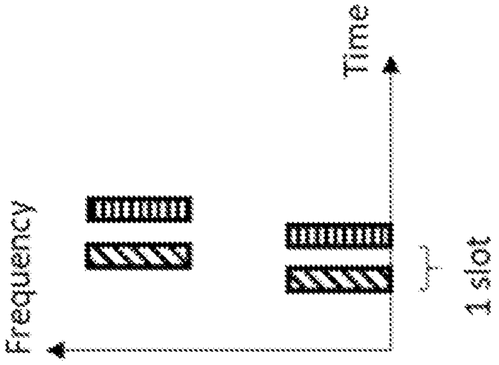
FIGS. 5-8 are graphs illustrating examples of inter-slot frequency hopping in accordance with some embodiments.
Figure 6:
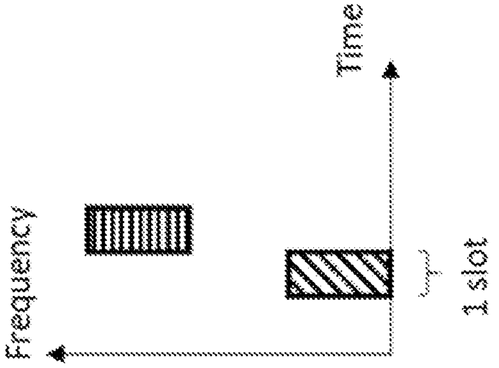
Figure 7:
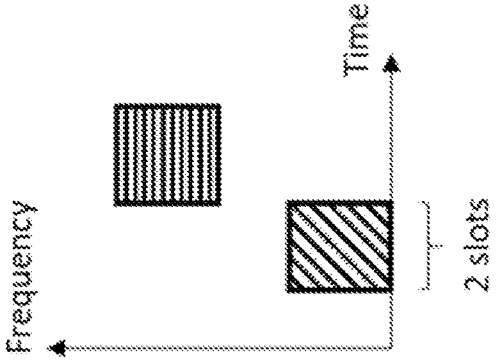
Figure 8:
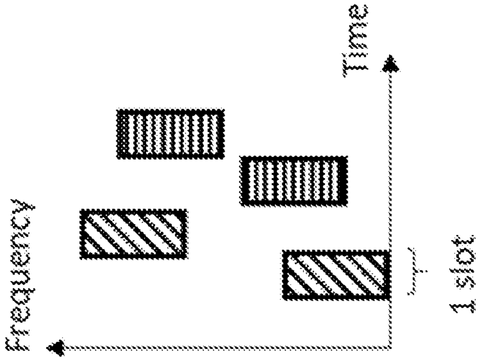

FIGS. 5-8 illustrate a few different hopping options. The cross shading indicates resources used by a first repetition and the horizontal shading indicates resources used by a second repetition. FIG. 5 illustrates an example of intra-slot frequency hopping. FIG. 6 illustrates an example of inter-slot frequency hopping with frequency change between every slot and every repetition. FIG. 7 illustrates an example of inter-slot hopping with frequency change only between repetitions. FIG. 8 illustrates an example of inter-slot frequency hopping with frequency change within repetitions.

In some embodiments, the hopping sequence is selected so that one avoids using the same set of frequency resources for repetitions that use the same HARQ redundancy version. This increases the diversity for repetitions that use the same HARQ redundancy version and can thereby improve performance. The frequency resources used for the same HARQ redundancy version may additionally be chosen to be far apart in frequency for maximum diversity. This further increases the diversity for repetitions using the same redundancy version. The same principles could apply also to repetitions not using exactly the same redundancy version but with substantial overlap in the coded bits being transmitted.

In additional or alternative embodiments, the total number of repetitions is configured independently of the number of repetitions and a(n existing) frequency hopping indicator signals that either the same frequency is used for all slots, or that the frequency is changed according to a predefined pattern. This helps reduce the amount of signaling needed.

In additional or alternative embodiments, the repetition factor is signaled in DCI with CRC scrambled by TC-RNTI for scheduling the retransmissions of Msg3 PUSCH.

In additional or alternative embodiments, the retransmitted Msg3 PUSCH follows the repetition configuration for the initial Msg3 transmission scheduled by RAR. Msg3 repetition is slot-based repetition. There is only one repetition in one slot. The same symbol allocation is applied across the repeated slots. This can reduce the amount of signaling needed, and help the UE better prepare for transmission in advance of being scheduled.

Herein, the number of Msg3 repetitions is referred to as N and the slot to carry the first Msg3 repetition is referred to as slot n.

In additional or alternative embodiments, for paired spectrum, the UE sends Msg3 in N consecutive slots starting from slot n. For unpaired spectrum, the UE sends Msg3 in consecutive slots starting from slot n. If the UE determines symbols of a slot allocated for Msg3 repetition as downlink symbols, this repetition is omitted. The omitted Msg3 repetition is counted in N slots.

In additional or alternative embodiments, the retransmitted Msg3 PUSCH is not allowed to do any repetition. This keeps the benefit of the repetition in the first transmission attempt (possibility of having successful reception without retransmissions and associated delays) while avoiding the downsides of repetition (e.g. coarse granularity in the amount of radio resources used) when retransmissions are anyway performed. In order to minimize the amount of signaling needed, the scheduling of the first transmission attempt could indicate the absence of repetition in subsequent transmissions, or the behavior could even be specified in the standard.

In additional or alternative embodiments, the retransmitted Msg3 PUSCH has a larger repetition factor than the earlier Msg3 retransmissions and/or the initial Msg3 transmission. In some examples, there is then the chance of having a successful reception with minimal amount of radio resources, while the risk of having to perform many (e.g. more than 1) retransmissions is reduced. This behavior could be specified in the standard, or signaled, e.g. in the scheduling message for the first transmission attempt.

In additional or alternative embodiments, since Msg3 is part of the initial access procedure, where the UE might not know the full configuration and scheduling patterns of the network, it can be useful to allow the network to tell the UE to refrain from using certain slots or parts of slots in the repetition. This can, for example, be useful for forward compatibility with future features that require the network to reserves certain slots or parts of slots for other uses.

In additional or alternative embodiments, the gNB can inform the UE to skip one or more slots, or groups of slots (e.g. all slots belonging to a certain repetition), in the repetition pattern. The skipping can be performed in terms of puncturing (e.g., reducing the total number of repetitions transmitted), but could alternatively shift the remaining repetitions (e.g., maintaining the total number of repetitions). In some examples, which slots to skip and not to skip can be signaled using a bitmap in order to have large flexibility with small amount of signaling (with a maximum of 8 repetition, a single byte is enough for such signaling). If the UE is required to skip certain repetitions for other reasons, for example, due to coinciding with a DL slot, the bits in the bitmap can be configured to refer only to not already skipped repetitions (in order to retain maximum signaling efficiency), or the bitmap can refer to all repetitions (e.g. in order to have consistent signaling and function even if the UE does not have knowledge of which repetitions to skip for other reasons).

In additional or alternative embodiments, the network may signal to the UE to use a set of slots that are spread out more in time (e.g., every second slot) or some other pattern. This may be useful if feedback between repetitions is desirable.

In additional or alternative embodiments, the network may dynamically signal to the UE to stop repetition (e.g. because the network has already successfully decoded the message). The gNB can send DCI format 0_0 with CRC scrambled by TC-RNTI to signal the early termination of PUSCH repetition. For example, field of new data indicator with value of 1 indicates TB has been successfully decoded. The absence of the field means TB has not been successfully decoded. This signaling can be applied to repetition of Msg3 and other PUSCH.

In additional or alternative embodiments, the network can configure PDCCH monitoring occasions when ACK for Msg3 is to be sent to reduce the UE's effort of monitoring PDCCH. For example for a Msg3 with 8 repetitions, the UE expects ACK for Msg3 in the DCI after 4 repetitions. The PDCCH monitoring occasion can be configured in Msg2 or a SIB.

In additional or alternative embodiments, the UE can be configured by the network to (automatically) use repetition for Msg3 when falling back from 2-step RA. This could be useful since the falling back from 2-step RA is an indication of suboptimal link quality, which could motivate repetition to avoid further delays in the connection attempt. The automatic switch to repetition minimizes the amount of signaling needed. In some examples, the UE is configured for 2-step RACH operation using a RACH-ConfigCommon-TwoStepRA information element and receives an indication in a MsgA-PUSCH-Config information element of how many repetitions should be used for Msg3. When the UE receives a MsgB that contains a fallbackRAR MAC subPDU, the UE transmits Msg3 with the indicated number of repetitions. In this example, RAR need not carry the number of repetitions, which reduces the overhead of MsgB and may avoid the need to define a new fallbackRAR format, allowing backward compatible signaling with prior release UEs that do not support Msg3 repetition being indicated.

In additional or alternative embodiments, a certain subset of PRACH preambles and/or PUSCH resources available for use by a UE are reserved for Msg3 repetition (e.g., a UE using those preambles and/or PUSCH resources will repeat the Msg3 multiple times). This allows the UE to choose the number of repetitions to perform and implicitly inform the gNB about the choice. The number of repetitions may be fixed (to minimize amount of signaling needed) or configurable (for flexibility/optimization of performance), or even a function of the used preamble/PUSCH resource (for even further flexibility and performance optimization). The choice could be based on estimated link quality, e.g. according to some 3GPP-specified table for mapping RSRP to number of repetitions.

In additional or alternative embodiments, the PRACH preamble may also be repeated in order to improve coverage.

In some embodiments, the UE has constant Tx power, using a constant outer loop power setting and the (single) adjustment in RAR over all repetitions. In additional or alternative embodiments, the transmit power is, based on signaling and/or specifications, adjusted by the UE whenever repetition is used (e.g. lower power may be needed if multiple repetitions are made). The amount of adjustment may be signaled or pre-determined in the specification.

In additional or alternative embodiments, the UE increases the transmit power from one repetition to the next, e.g. ramping the power over the repetitions. The ramping may be performed based on signaling and/or specification (to minimize amount of signaling), Alternatively, closed-loop power control may be used.

In additional or alternative embodiments, the configuration of Msg3 or MsgA PUSCH repetition and/or Msg3 or MsgA PUSCH frequency hopping can be associated to one or more of the following factors: the measurement on the received PRACH; or the RA type, where the RA type can be for example a four step or a two step random access procedure type. For example, the SNR or signal level can be measured and compared with a threshold value wherein the threshold can be a predetermined value or can be different values for different frequency band (e.g. low band, high band) or for different services (e.g. normal service or mission critical services). In an alternative example, if a 2-step RA type is selected, repetition and/or frequency hopping can be always enabled.

In some embodiments, the Msg3 PUSCH TBS determination procedure is modified to achieve lower code rate for Msg3 PUSCH, i.e., the actual spectral efficiency used for the TB transmission is lower than the nominal spectral efficiency ($Q_m \cdot R$) from the MCS table. By lowering the coding rate of PUSCH, an improved decoding performance is expected.

In additional or alternative embodiments, the TBS scaling is applied, where the TBS scaling factor S is applied, S is a positive value and S<=1. More specifically, TBS determination follows the procedure for determining transport block size for PUSCH carrying message 3 as described above, except that the calculation of the intermediate number of PUSCH information bits (Ninfo) in step 2 is modified to include TBS scaling according to $N_{info}=S \cdot N_{RE} \cdot R \cdot Q_m \cdot \nu$, rather than $N_{info}=N_{RE} \cdot R \cdot Q_m \cdot \nu$. The code rate R and modulation order $Q_m$ can be provided by the MCS index IMCS together with the MCS table. The variable $N_{RE}$ represents the number of resource elements usable for transmitting the TB, and is provided by the time and frequency domain configurations. The v is number of layers, which should be always 1 for Msg3.

For $N_{RE}$ calculation, two variables $$N_{DMRS}^{PRB} \text{ and } N_{oh}^{PRB}$$

are also needed.

$$N_{DMRS}^{PRB}$$

is the number of REs for DM-RS per PRB in the allocated duration for PUSCH. Thus $$N_{DMRS}^{PRB}$$

is determined by DM-RS configuration of the PUSCH transmission, including the number of DM-RS CDM group and DM-RS ports.

$$N_{oh}^{PRB}$$

is the number of REs per PRB for other overhead. For simplicity, N_oh^PRB is always 0 for Msg3.

One or more possible TBS scaling factors can be defined similar to the TBS scaling for PDSCH for Paging and RAR. As an example, the scaling factor table of 4 entries is shown in FIG. 9. Alternatively, a scaling factor table of 2 entries is shown in FIG. 10.

In additional or alternative embodiments, the TBS scaling factor S used can be determined by being signaled in a system information or RRC dedicated signaling. That is, the semi-static value of S is sent from gNB to UE, and the UE applies the signaled value S.

In additional or alternative embodiments, the gNB configures a set of possible values for S, for example, 2 possible values as shown in FIG. 10. The UE chooses one value from the set and apply it for a given MsgA transmission. The UE may select the scaling factor S according to an estimate of channel quality such as RSRP, where if the channel quality is above a or below threshold, a larger or a smaller value of S is used, respectively. At the gNB receiver, which value of S the UE selects is not known and the receiver may blindly detect which value of S is actually used. For example, gNB tries the two possible values, S=0.5 or 0.25, in FIG. 10. The value S that results in successful detection of the PUSCH is deemed the value actually applied by the UE. Successful detection of the PUSCH is achieved when the decoding of the carried transport block successfully passes the CRC check.

In additional or alternative embodiments, the value of S is implicitly determined by other known parameters. For example, other known parameters are used to select one value from the set of 4 possible S values shown in FIG. 9. Possible parameters that can be used for value S derivation include one or more of the following: PRACH preamble (format and/or ID); PRACH occasion; DMRS information; use cases; frequency band (licensed or unlicensed FR1 or FR2).

In additional or alternative embodiments, S takes a fixed value (e.g., S=0.25);

In additional or alternative embodiments, S is signaled in a RAR UL grant or in the MAC subheader for RAR or in RAR subPDU but not in the UL grant.

In additional or alternative embodiments, a higher modulation type can also be used when a low coding rate is expected for Msg3 PUSCH.

In additional or alternative embodiments, repetition and scaling factors are coupled in the sense that a scaling factor S is associated with a repetition factor 1/S.

In additional or alternative embodiments, where the number of repetitions is indicated by the network, the network may determine the number of repetitions according to an assumption that the UE will not have sufficient transmission power to transmit Msg3 such that it will be reliably received. However, the network in general has quite limited information on the power headroom available for UEs during initial access, since there is no normally no power headroom report available and since the UE's selection of preamble group A or B only identifies if there is enough headroom to transmit a single repetition of Msg3. Furthermore, if preamble group B is selected (indicating that the UE does have enough power headroom for Msg3), but the network determines that it should use a power control command in Msg2 so that Msg3 can be received reliably, then the UE may not have enough remaining headroom to transmit according to the power control command. By contrast, the UE is aware of how much power it has and can determine if it can deliver the amount of power it is configured to according to Msg3 power control. In the cases it can't deliver the needed amount of power, it could decide to repeat Msg3 to deliver additional power. By allowing the UE to repeat only when needed, uplink resources and UE power wasted on unneeded repetition can be avoided.

In some embodiments, the UE determines when to repeat based on its power headroom. If the Msg3 transmit power is less than its maximum configured power $P_{CMAX,f,c}(i)$ (abbreviated as 'Pcmax' in the following), the UE does not repeat. If it is more than Pcmax, then the UE transmits repetitions of Msg3. The UE may compute a tentative power value $P_1$ for the power it would transmit for a single transmission (i.e. without repetition) if it were not limited to the maximum configured power as the following, where the variables in right hand side of the equation are as defined in section 7.1.1 of 3GPP TS 38.213 revision 16.1.0 and in units of decibels.

$$P_1 = P_{O_{PUSCH},b,f,c}(j) + 10\log_{10}\left(2^{\mu} M_{RB,b,f,c}^{PUSCH}(i)\right) + \alpha_{b,f,c} PL_{b,f,c}(q_d) + \Delta_{TF,b,f,c}(i) + f_{b,f,c}(i, l)$$

If $P1 > P_{CMAX,f,c}(i)$ then in the embodiment the UE will repeat Msg3, transmitting each repetition at a power less than or equal to $P_{CMAX,f,c}(i)$.

In additional or alternative embodiments, the UE determines the number of transmissions by calculating the linear value of the combined power of N transmissions $$\hat{P}_{Tot}(N) = \sum_{n=1}^{N} \hat{P}(n),$$

where $\hat{P}(n)$ is the linear value of power transmitted for repetition n and selecting the smallest value of N such that $$\hat{P}_1 \hat{P}_{Tot}(N) \cdot \hat{P}_{CMAX,f,c}(i),$$

where $\hat{P}_1$ and $\hat{P}_{CMAX,f,c}(i)$ are linear values of the respective powers. This can be done by setting $\hat{P}(n)=\hat{P}_1/\text{ceil}(\hat{P}_1/P_{CMAX,f,c}(i))$ where ceil(x,y) is the next largest integer greater than x/y. This approach splits up the power that would have been used in one transmission equally among N transmissions, thereby producing no more total interference power than would be required for one transmission and minimizing the energy needed by the UE to transmit the repetitions. Alternatively, when selecting the value of N, the UE determines a same required power for each transmission n as $\hat{P}(n)=\hat{P}_1\cdot g(N)$, where $g(N)<1$ is a predetermined power scaling factor for N transmissions and N is selected such that $\hat{P}(n)\leq P_{CMAX,f,c}(i)$. In another alternative, $\hat{P}(n)=P_{CMAX,f,c}(i)$ and N is selected as the smallest value such that $\hat{P}_{Tot}(N)\geq\hat{P}_1$. In other words, when the transmissions are at the maximum configured power, the number of transmissions N is the smallest such that the combined power across transmissions is greater than or equal to the power required for single slot transmission.

In additional or alternative embodiments, a UE adapts a number of transmissions of a physical channel in a random access procedure. The UE determines a power $P_1$ for a first transmission of a physical channel. If $P_1$ is greater than a maximum transmission power, $P_{max}$, for the first transmission, the UE transmits the first transmission with a power P', where P' is less than or equal to $P_{max}$, and conveys information bits from the first transmission in a second transmission. If $P_1$ is less than or equal to $P_{max}$ for the first transmission, the UE transmits the first transmission with the power $P_1$.

Because the UE determines the number of transmissions, the number of transmissions must either be provided to the gNB by the UE, or the gNB will need to determine this itself. If UEs transmit repetitions in resources that are known to the gNB, the gNB can blindly detect the number of transmissions N by hypothesizing that a UE has transmitted with N transmissions and receiving and decoding the transmission present in the resources that would be occupied by the N transmissions. Alternatively, the gNB can first detect the energy of the DMRS and/or the PDSCH that would be present for a given hypothesized number of repetitions and decode the Msg3 only if there is sufficient energy, which will save computational resources in the gNB by avoiding decoding when Msg3 is not transmitted with the given number of repetitions. In these approaches where blind detection and/or DMRS energy detection is used, if the network does not schedule other UEs in the same resources as the UE transmitting Msg3, additional indication of the presence of the UE in the resources such as signaling or using different DMRS ports is needed. This has the benefit of avoiding additional overhead needed for the signaling and is compatible with the case where UEs do share the resources using MU-MIMO techniques, as is described below.

In some embodiments, it is desirable to control the maximum number of repetitions that the UE can use for Msg3 so that the network can know how much PUSCH resource to reserve for the repetitions. The maximum number of resources could be indicated in Msg2 random access response (as is done in LTE), but this requires NR UEs to read a new RAR format. And since RARs for multiple UEs can be multiplexed in one Msg2, all UEs reading the RAR would need to be able to read the new format. If the maximum number is instead indicated in a SIB, then since SIBs are extensible such that new fields can be added while still allowing prior release UEs to read the old fields, new release UEs can obtain the maximum number. Therefore, one example is to transmit a number of repetitions in an SIB to enable UEs to repeat Msg3 in a revised RA procedure and to use an existing RAR format (such as a prior release RAR format) to carry the RAR in the revised RA procedure, so that both UEs supporting and not supporting the revised RA procedure can still read the RAR used in the revised RA procedure. A prior release RAR format can be one that is used by a UE that sets an AccessStratumRelease information element to a value indicating a release earlier than the AccessStratumRelease value of the UE that supports the revised RA procedure. For example, a Rel-15 UE can set its AccessStratumRelease IE to Tell 5', and can read fields carried in SIB1 defined in Rel-15, which are generally those not with a suffix indicating a later release, for example '-r16'. Then in the embodiment, a Rel-17 UE with the capability might read an -r17 suffixed field carried in SIB, for example carried in RACH-ConfigCommon, that identifies the maximum number of Msg3 repetitions, receive a RAR defined for Rel-15, and transmit Msg3 with repetition. The Rel-15 UE would not read the -r17 suffixed field identifying the maximum number of repetitions, but would also receive a RAR defined for Rel-15 and transmit Msg3 without repetition. This approach can also be used in embodiments where the gNB indicates the number of repetitions for Msg3, rather than where the UE determines the number. In such embodiments, the number of repetitions carried in the system information block is not a maximum number of repetitions that may be used for Msg3, but rather the number of repetitions to be used for Msg3.

In additional or alternative embodiments, where UEs repeat Msg3, the UE receives a system information block. The UE also receives a random access response identifying resources to carry one Msg3 transmission. If the UE receives an indication of a number of repetitions in the system information block, transmits Msg3 according to the random access response and using the number of repetitions given in the system information block. In some such embodiments, the UE determines resources for repeated transmissions of the Msg3 by shifting the resources for the one Msg3 transmission by a predetermined amount in time and/or frequency for each repetition. If the UE does not receive an indication of the number of repetitions in the system information block, it determines the resources to be used for Msg3 transmission as those used to carry the one Msg3 transmission. In some such embodiments, the number of repetitions is a maximum number, and the UE determines a number of repetitions with which to transmit Msg3, where the number is not more than the maximum number of repetitions. In other embodiments, the number of repetitions is the number of repetitions with which to transmit Msg3, and the UE transmits Msg3 with that number of repetitions.

Because the UE can transmit with any number of repetitions up to a maximum number Nmax, the gNB should reserve resources for all Nmax transmissions. Reserving this extra resource reduces spectral efficiency if the UE does not need to transmit all Nmax repetitions. If there are multiple UEs each transmitting fewer repetitions than Nmax, they may share the same resource and exploit MU-MIMO operation. One way to do this is to define a beginning transmission slot with a function of the number of repetitions N and an offset k that is specific to each UE that may share the resources. For example, assuming that repetition lengths of N=2^M are used where M is an non-negative integer, then the starting offsets m for these lengths can be m=Nmax/N*rem(k,Nmax/N) with k=0 . . . N−1, where rem(x,y) is the modulo division of x by y. The UE may determine k by receiving a value for k carried as a field in a RAR. Alternatively, the UE can determine k by which MAC subPDU in a RAR carries the random access preamble ID (RAPID) that the UE used to transmit its RACH preamble that the RAR is in response to. If MAC subPDUs in a RAR are indexed by the integer j in the order they appear in the RAR, starting with 0, then we may set k=rem(j, N), with j corresponding to the MAC subPDU carrying the RAPID for the UE. Each UE should be further differentiated by the DMRS used for its PUSCH. This can be done by using a DMRS configuration that is different for each UE and is assigned in the RAR. Alternatively, the DMRS configuration can be identified by the index j of the MAC subPDU in the RAR that carries the RAPID for the UE. Each DMRS configuration may comprise a DMRS port number or a combination of a DMRS port number and a DMRS sequence.

FIG. 11 is a table illustrating an example resource selection calculation that considers where 5 UEs can transmit within the same PUSCH resource. The UEs can each transmit up to Nmax=4 repetitions, but select N=2, 4, 1, 2, and 1 repetition, respectively. The value for j for each UE is the index of their MAC subPDU in the RAR, and k can be calculated as k=rem(j, N) to obtain the values shown in the table. The corresponding values of the starting index m=Nmax/N*rem(k,Nmax/N). Lastly, a distinct DMRS configuration is assigned to each of the five UEs, indexed with 0-4. The index is set to the value of j in this example.

Figure 12:
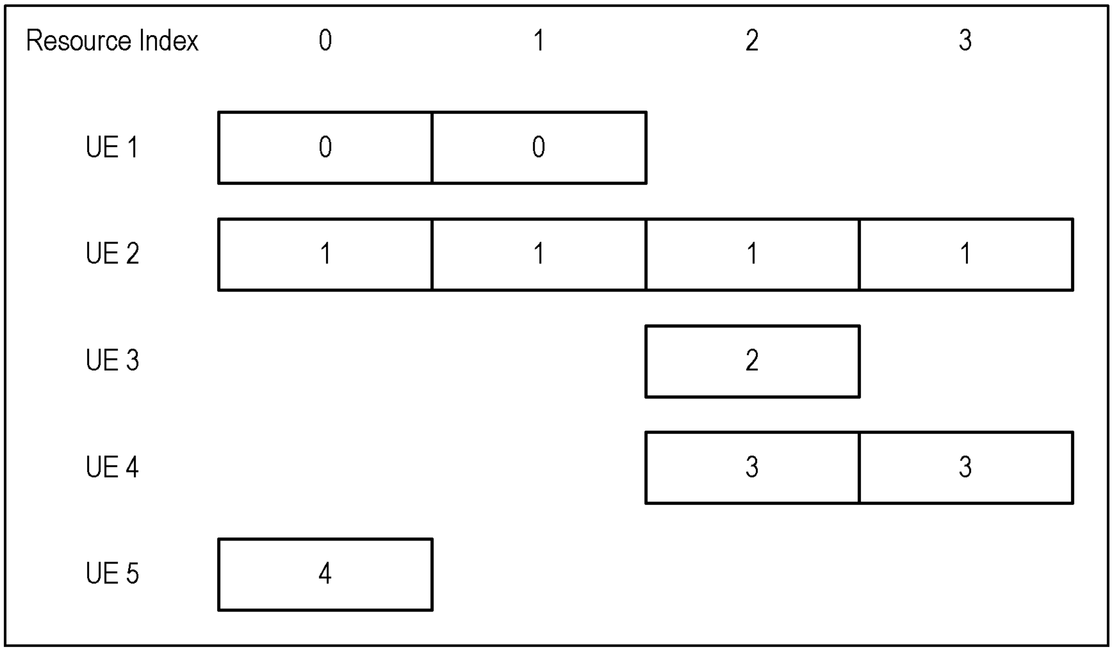
FIG. 12 is a schematic diagram illustrating an example of occupied resources in example resource selection in accordance with some embodiments.

The PUSCH resources occupied by each UE in FIG. 11 are illustrated in FIG. 12. Each resource can carry a transmission of the physical channel, and can be identified by the DMRS configuration (identified as a number within the rectangle representing a transmission for a UE). Four different resources, for example in 4 adjacent slots and occupying a same set of subcarriers are shown. The first resource, 0, contains transmissions by UEs 1, 2, and 5, while resource 1 contains UEs 1 and 2, resource 2 contains UEs 2, 3, and 4, and resource 3 has UEs 2 and 4. It can be observed that the resources contain 2 or 3 UEs, due to the property of the embodiment that changes the starting index. This facilitates interference cancellation reception by the network, since a constant, minimal number of interfering UEs is more compatible with a fixed number of receive antennas used for interference cancellation.

In some embodiments, where UEs determine when to repeat Msg3 and the number of Msg3 repetitions, it determines a starting resource for the Msg3 transmission according to m=Nmax/N*rem(k,Nmax/N), where m is an index of the starting resource, N is the number of repetitions determined by the UE, Nmax is the maximum number of repetitions the UE may use to transmit Msg3, and k is a non-negative integer less than Nmax. In additional or alternative embodiments, k may be provided to the UE in a random access response. In additional or alternative embodiments, k may be determined as k=rem(I,N), where I is an index identifying the position of a MAC subPDU in a random access response, where the subPDU carries a random access preamble identifier for a preamble transmitted by the UE.

Operations of a communication device will now be discussed with reference to the flow charts of FIGS. 16-19 according to some embodiments of inventive concepts. FIGS. 16-19 will be described below as being performed by communication device 1300 (implemented using the structure of the block diagram of FIG. 13). For example, modules may be stored in memory 1305 of FIG. 13, and these modules may provide instructions so that when the instructions of a module are executed by respective processing circuitry 1303, processing circuitry 1303 performs respective operations of the flow charts. However, the operations in FIGS. 16-19 may be performed by any suitable communication device.

Figure 16:
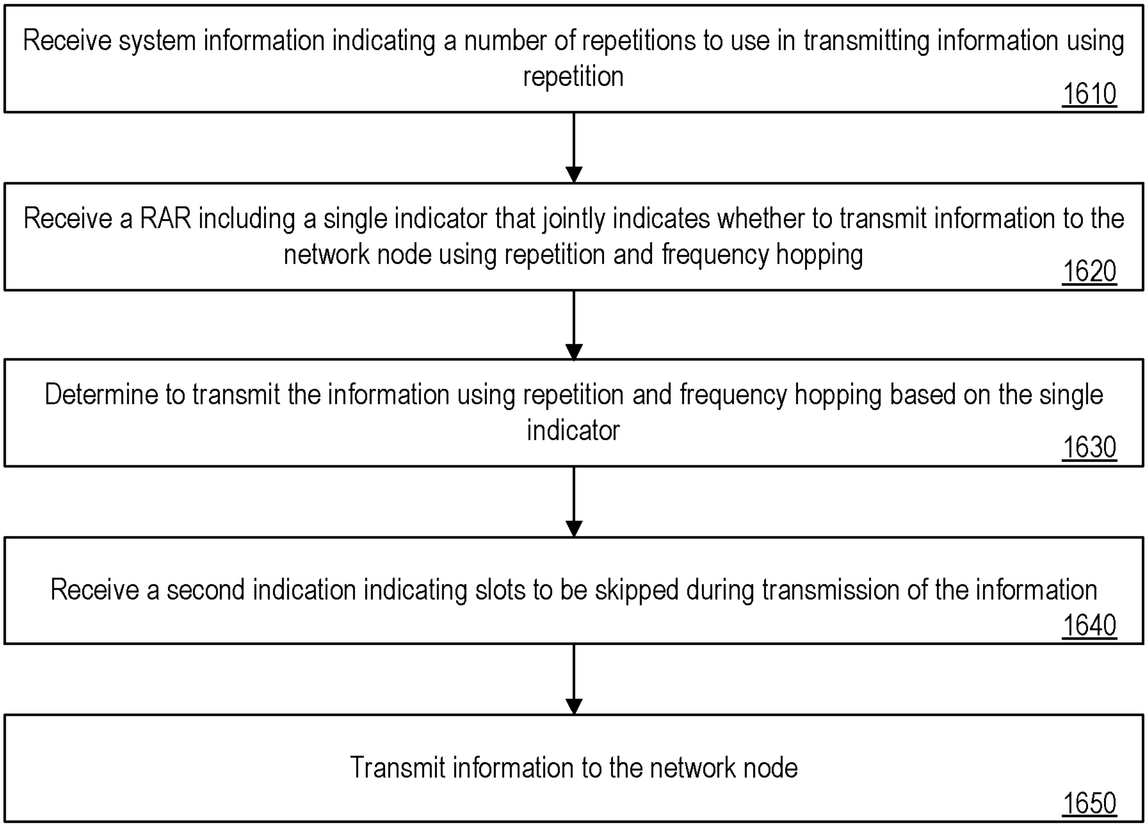
FIGS. 16-19 are flow charts illustrating examples of processes performed by a communication device in accordance with some embodiments.

In FIG. 16, at block 1610, processing circuitry 1303 receives, via transceiver 1301, system information indicating a number of repetitions to use in transmitting information using repetition. In some embodiments, the information is Msg3 information.

At block 1620, processing circuitry 1303 receives, via transceiver 1301, a RAR including a single indicator that jointly indicates whether to transmit information to the network node using repetition and frequency hopping. In some embodiments, the single indicator includes a frequency hopping flag field with a length of one bit.

At block 1630, processing circuitry 1303 determines to transmit the information using repetition and frequency hopping based on the single indicator. In some embodiments, the information is Msg3 information and is transmitted via a physical uplink shared channel ("PUSCH"). In additional or alternative embodiments, transmitting the information using repetition includes transmitting a plurality of transmissions to the network node, each transmission of the plurality transmissions conveying a same set of information bits. In additional or alternative embodiments, transmitting the information using frequency hopping includes transmitting a first transmission and a second transmission using different frequency resources. In additional or alternative embodiments, the plurality of transmissions includes the first transmission and the second transmission. Transmitting the first transmission and the second transmission using different frequency resources includes transmitting a first transmission of the plurality of transmissions using first frequency resources and transmitting a second transmission of the plurality of transmissions using second frequency resources that are different than the first frequency resources.

In additional or alternative embodiments, transmitting the first transmission and the second transmission using different frequency resources further includes determining that the first transmission and the second transmission share a hybrid automatic repeat request, HARQ, redundancy version and determining to transmit the first transmission and the second transmission using different frequency resources based on determining that the first transmission and the second transmission share the HARQ redundancy version.

In additional or alternative embodiments, the plurality of transmissions is a first plurality of transmissions including the first transmission and the set of information bits is a first set of information bits. Transmitting a first transmission and a second transmission using different frequency resources can include transmitting each transmission of the first plurality of transmissions using a first frequency and transmitting each transmission of a second plurality of transmissions that includes the second transmission using a second frequency that is different than the first frequency. Each transmission of the second plurality of transmissions can convey a same second set of information bits that are different than the first set of information bits.

In additional or alternative embodiments, the single indicator includes an indication of a number of transmissions in the plurality of transmissions. Determining to transmit the information using repetition and frequency hopping can include determining that the number is greater than one based on the bit and determining to transmit the information using repetition and frequency hopping based on the number being greater than one.

At block 1640, processing circuitry 1303 receives, via transceiver 1301, a second indication indicating slots to be skipped during transmission of the information. In some embodiments, the second indication includes a bitmap. In additional or alternative embodiments, the second indication indicates a pattern of slots to skip.

At block 1650, processing circuitry 1303 transmits, via transceiver 1301, information to the network node. In some embodiments, transmitting the information includes transmitting the information during non-skipped slots.

In additional or alternative embodiments, responsive to transmitting a portion of the information, processing circuitry 1303 receives, via transceiver 1301, an indication from the network node indicating to terminate repetition.

Figure 17:
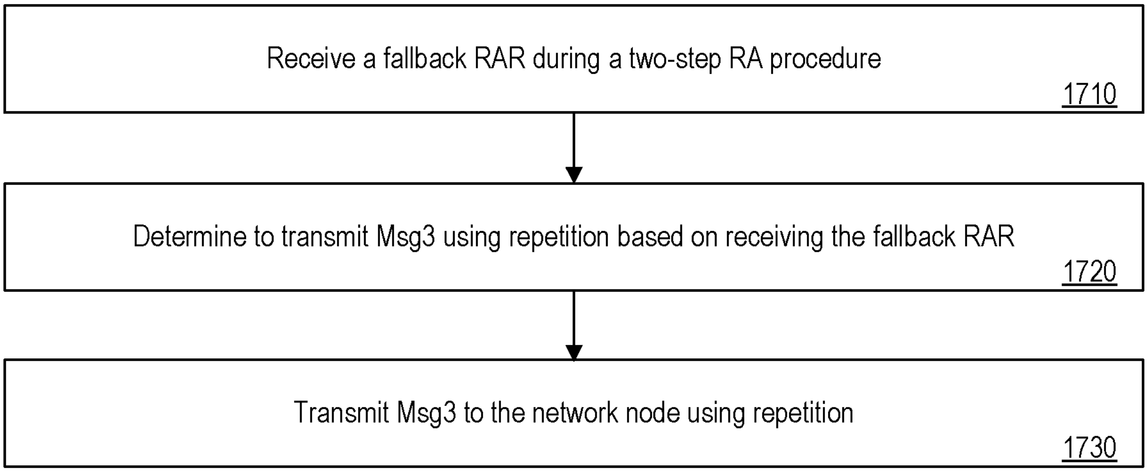

In FIG. 17, at block 1710, processing circuitry 1303 receives, via transceiver 1301, a fallback RAR during a two-step RA procedure. At block 1720, processing circuitry 1303 determines to transmit Msg3 using repetition based on receiving the fallback RAR. At block 1730, processing circuitry 1303 transmits, via transceiver 1301, Msg3 to the network node using repetition.

Figure 18:
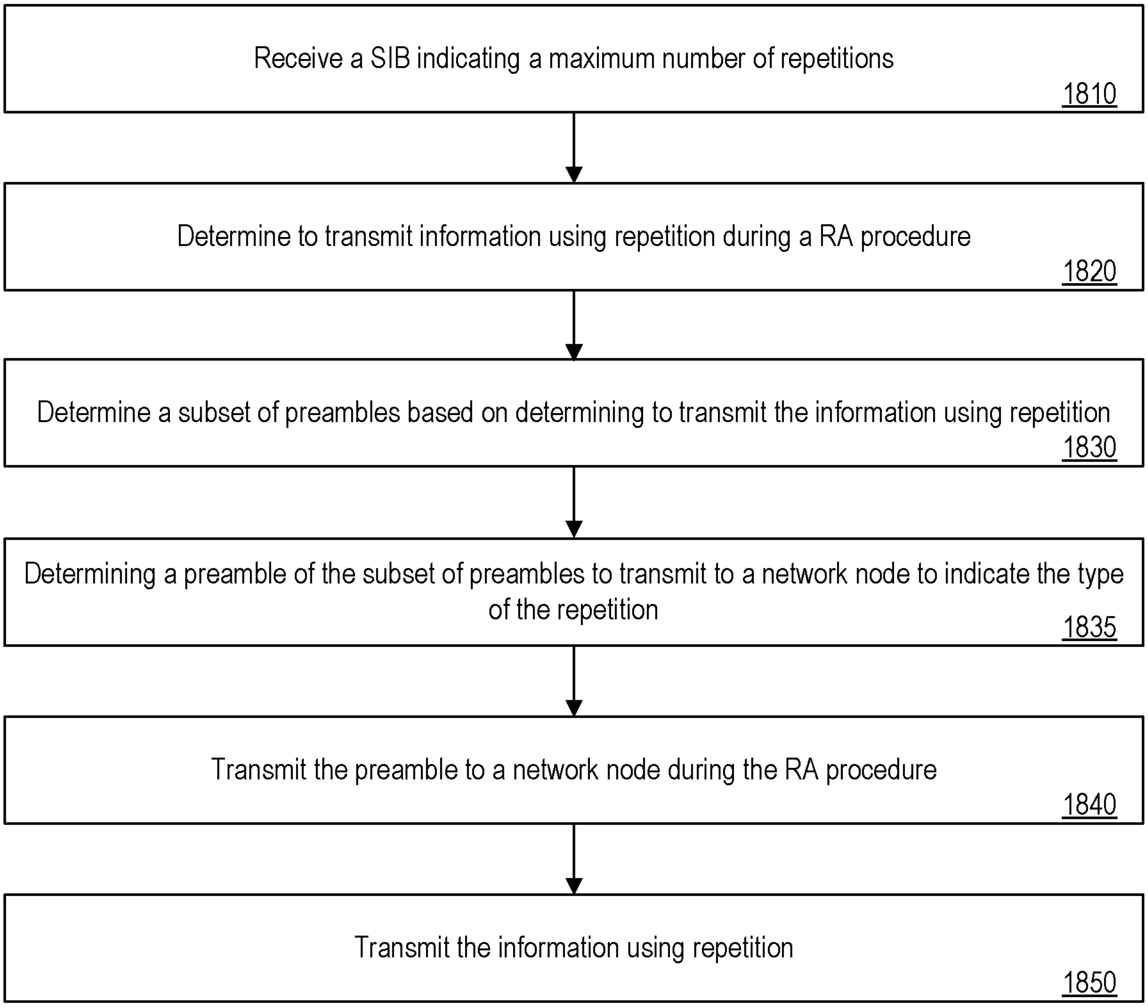

In FIG. 18, at block 1810, processing circuitry 1303 receives, via transceiver 1301, a SIB indicating a maximum number of repetitions.

At block 1820, processing circuitry 1303 determines to transmit information using repetition during a RA procedure. In some embodiments, the RA procedure is a two-step RA procedure and the information is MsgA information. Determining to transmit the MsgA information using repetition can include determining to transmit the MsgA information using repetition based on the RA procedure being a two-step RA procedure.

In additional or alternative embodiments, determining to transmit the information using repetition includes determining a tentative transmit power for transmitting the information is greater than a maximum transmit power of the communication device and determining to transmit the information using repetition based on the tentative transmit power being greater than the maximum transmit power.

At block 1830, processing circuitry 1303 determines subset of preambles based on determining to transmit the information using repetition.

At block 1835, processing circuitry 1303 determines a preamble of the subset of preambles to transmit to a network node to indicate the type of the repetition.

At block 1840, processing circuitry 1303 transmits, via transceiver 1301, the preamble to a network node during the RA procedure.

At block 1850, processing circuitry 1303 transmits, via transceiver 1301, the information using repetition. In some embodiments, the information is Msg3 information and is transmitted via a PUSCH. In additional or alternative embodiments, transmitting the information using repetition can include transmitting a number of repetitions of the information based on the maximum number of repetitions.

Figure 19:
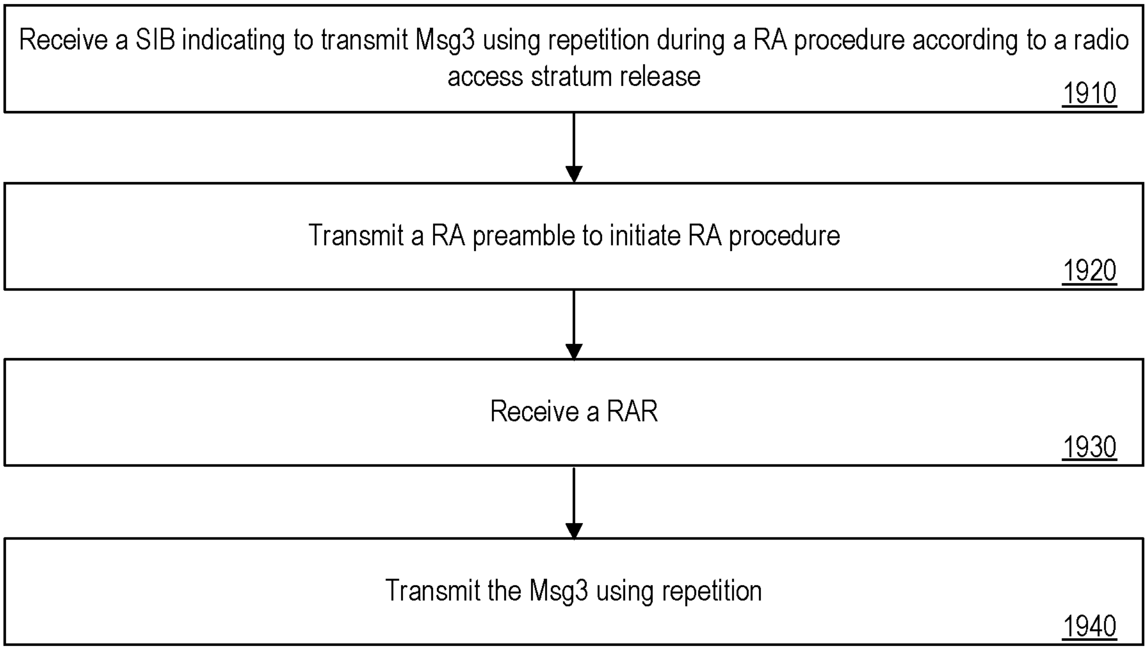

In FIG. 19, at block 1910, processing circuitry 1303 receives, via transceiver 1301, a SIB indicating to transmit Msg3 using repetition. The SIB includes an indication indicating to transmit Msg3 using repetition during a random access, RA, procedure according to a radio access stratum release. At block 1920, processing circuitry 1303 transmits, via transceiver 1301, a RA preamble to initiate RA procedure. At block 1930, processing circuitry 1303 receives, via transceiver 1301, a RAR. At block 1940, processing circuitry 1303 transmits, via transceiver 1301, the Msg3 using repetition. In some embodiments, the radio access stratum release is a first release and the communication device supports a second release that is different than the first release.

Various operations of FIGS. 16-19 may be optional with respect to some embodiments of communication devices and related methods. For example, regarding the method of Example Embodiment 1 below, for example, operations of blocks 1610 and 1640 of FIG. 16 and all blocks of FIGS. 17-19 may be optional.

Figure 20:
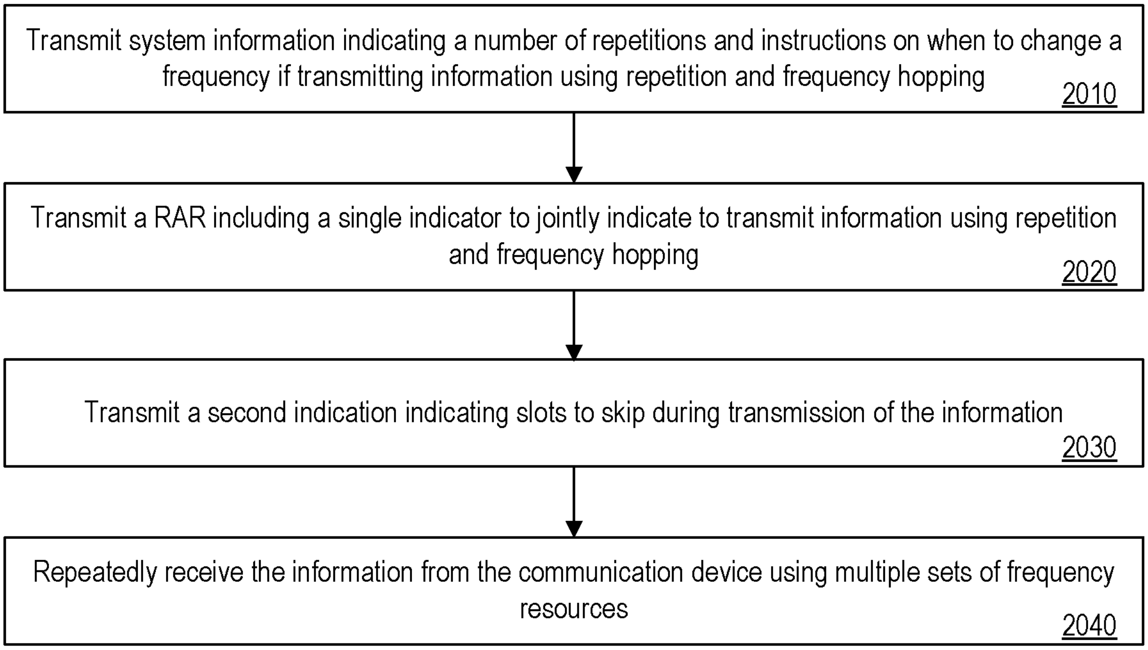
FIGS. 20-22 are flow charts illustrating examples of processes performed by a network node in accordance with some embodiments.
Figure 21:
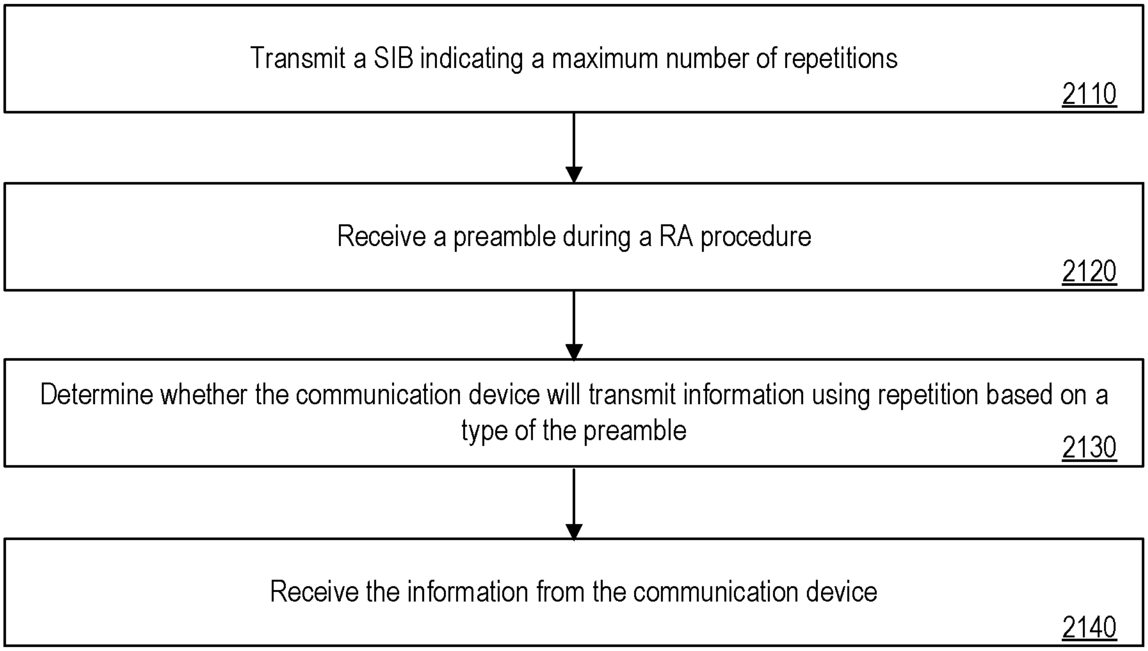
Figure 22:
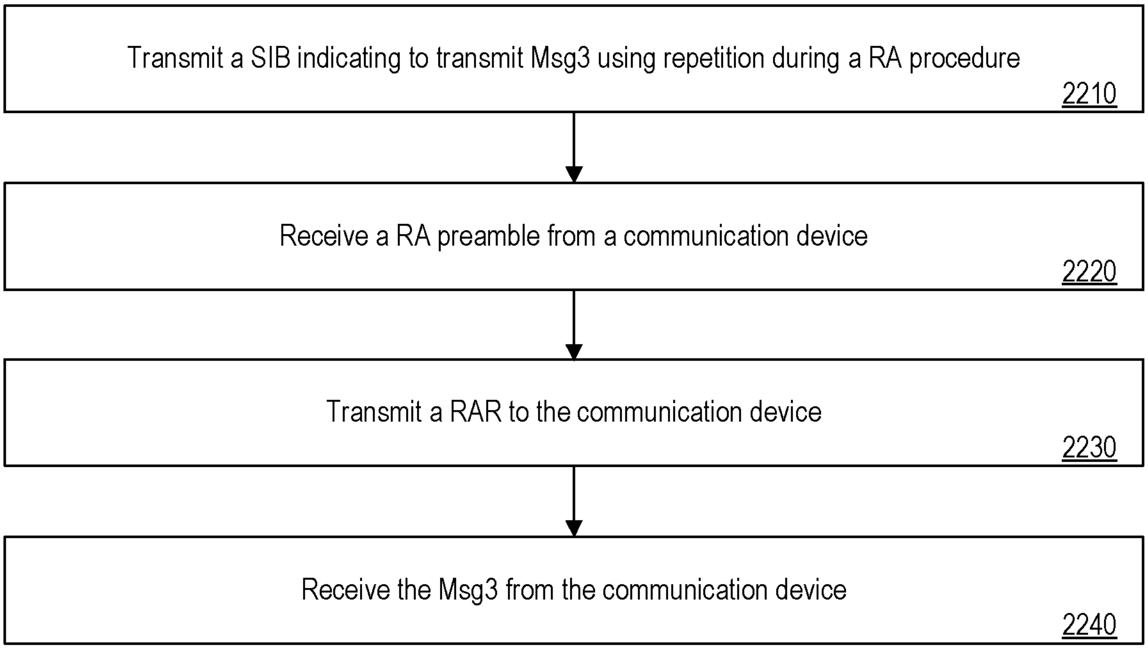

Operations of a network node will now be discussed with reference to the flow chart of FIGS. 20-22 according to some embodiments of inventive concepts. FIGS. 20-22 will be described below as being performed by RAN node 1400 (implemented using the structure of the block diagram of FIG. 14). For example, modules may be stored in memory 1405 of FIG. 14, and these modules may provide instructions so that when the instructions of a module are executed by respective processing circuitry 1403, processing circuitry 1403 performs respective operations of the flow charts. However, the operations in FIGS. 20-22 may be performed by any suitable network node.

In FIG. 20, at block 2010, processing circuitry 1403 transmits, via transceiver 1401, system information indicating a number of repetitions and instructions on when to change a frequency if transmitting information using repetition and frequency hopping.

At block 2020, processing circuitry 1403 transmits, via transceiver 1401, a RAR including a single indicator to jointly indicate to transmit information using repetition and frequency hopping. In some embodiments, the single indicator includes a frequency hopping flag field with a length of one bit.

At block 2030, processing circuitry 1403 transmits, via transceiver 1401, a second indication indicating slots to skip during transmission of the information. In some embodiments, the second indication is a bitmap. In additional or alternative embodiments, the second indication further indicates a patter of slots to skip.

At block 2040, processing circuitry 1403 repeatedly receives, via transceiver 1401, the information from the communication device using multiple sets of frequency resources. In some embodiments, the information is Msg3 information and is received via a PUSCH.

In FIG. 21, at block 2110, processing circuitry 1403 transmits, via transceiver 1401, a SIB indicating a maximum number of repetitions. In some embodiments, the SIB includes an indication indicating to transmit Msg3 using repetition during a random access, RA, procedure according to a release of a 3GPP communication standard that defines a radio access stratum (also referred to herein as a radio access stratum release). The radio access stratum release may be newer than, and therefore not supported by, a release implemented by one or more communication devices that receive the SIB. In effect, this means that the one or more communications devices will not recognize certain fields carried in the SIB that are defined in the newer release and such communication device(s) would therefore not recognize the repetition indication in the SIB and would transmit Msg3 without repetition.

At block 2120, processing circuitry 1403 receives, via transceiver 1401, a preamble during a RA procedure.

At block 2130, processing circuitry 1403 determines whether the communication device will transmit information using repetition based on a type of the preamble. In some embodiments, the information is Msg3 information. In additional or alternative embodiments, determining whether the communication device will transmit information using repetition based on the subset of preambles associated with the preamble includes determining a number of times the Msg3 information will be transmitted by the communication device based on the subset of preambles.

At block 2140, processing circuitry 1403 receives, via transceiver 1401, the information from the communication device. In some embodiments, the information is Msg3 information.

In FIG. 22, at block 2210, processing circuitry 1403 transmits, via transceiver 1401, a SIB indicating to transmit Msg3 using repetition during a RA procedure. At block 2220, processing circuitry 1403 receives, via transceiver 1401, a RA preamble from a communication device. At block 2230, processing circuitry 1403 transmits, via transceiver 1401, a RAR to the communication device. At block 2240, processing circuitry 1403 receives, via transceiver 1401, the Msg3 from the communication device.

Various operations of FIGS. 20-22 may be optional with respect to some embodiments of network nodes and related methods. Regarding the method of Example Embodiment 22 below, for example, operations of blocks 2010 and 2030 of FIG. 20 and all blocks of FIGS. 21-22 may be optional.

Example Embodiments are included below.

Embodiment 1. A method of operating a communication device in a communications network, the method comprising:

receiving (1620) a random access response, RAR, from a network node in the communications network during a random access, RA, procedure, the RAR including a single indicator that jointly indicates whether to transmit information to the network node using repetition and frequency hopping;

determining (1630) to transmit the information using repetition and frequency hopping based on the single indicator; and responsive to determining to transmit the information using repetition and frequency hopping, transmitting (1650) the information to the network node.

Embodiment 2. The method of Embodiment 1, wherein the information is Msg3 information, and wherein transmitting the information to the network node comprises transmitting the information via a physical uplink shared channel, PUSCH.

Embodiment 3. The method of any of Embodiments 1-2, wherein transmitting the information comprises transmitting the information using repetition by transmitting a plurality of transmissions to the network node, each transmission of the plurality transmissions conveying a same set of information bits, and wherein transmitting the information using frequency hopping comprises transmitting a first transmission and a second transmission using different frequency resources.

Embodiment 4. The method of Embodiment 3, wherein the plurality of transmissions includes the first transmission and the second transmission, and wherein transmitting the first transmission and the second transmission using different frequency resources comprises transmitting a first transmission of the plurality of transmissions using first frequency resources and transmitting a second transmission of the plurality of transmissions using second frequency resources that are different than the first frequency resources.

Embodiment 5. The method of Embodiment 4, wherein transmitting the first transmission and the second transmission using different frequency resources further comprises:

determining that the first transmission and the second transmission share a hybrid automatic repeat request, HARQ, redundancy version; and determining to transmit the first transmission and the second transmission using different frequency resources based on determining that the first transmission and the second transmission share the HARQ redundancy version.

Embodiment 6. The method of Embodiment 3, wherein the plurality of transmissions is a first plurality of transmissions including the first transmission, wherein the set of information bits is a first set of information bits, and wherein transmitting a first transmission and a second transmission using different frequency resources comprises transmitting each transmission of the first plurality of transmissions using a first frequency and transmitting each transmission of a second plurality of transmissions that includes the second transmission using a second frequency that is different than the first frequency, each transmission of the second plurality of transmissions conveying a same second set of information bits that are different than the first set of information bits.

Embodiment 7. The method of any of Embodiments 3-6, further comprising:

receiving (1610), prior to receiving the RAR, system information indicating a number of transmission in the plurality of transmissions and instructions on when to change a frequency used to transmit the plurality of transmissions.

Embodiment 8. The method of any of Embodiments 3-7, wherein the single indicator comprises an indication of a number of transmissions in the plurality of transmissions, wherein determining to transmit the information using repetition and frequency hopping comprises:

determining that the number is greater than one based on the bit; and determining to transmit the information using repetition and frequency hopping based on the number being greater than one.

Embodiment 9. The method of any of Embodiments 1-8, wherein the single indicator comprises a frequency hopping flag field with a length of one bit.

Embodiment 10. The method of any of Embodiments 1-9, further comprising:

receiving (1640), a second indication from the network node indicating slots to skip during transmission of the information, wherein transmitting the information further comprises transmitting the information during non-skipped slots.

Embodiment 11. The method of Embodiment 10, wherein the second indication comprises a bitmap.

Embodiment 12. The method of any of Embodiments 10-11, wherein the second indication further indicates a pattern of slots to skip.

Embodiment 13. The method of any of Embodiments 1-12, further comprising:

responsive to transmitting a portion of the information, receiving a second indication from the network node indicating to terminate repetition.

Embodiment 14. A method of operating a communication device in a communications network, the method comprising:

receiving (1710) a fallback random access response, RAR, from a network node in the communications network during a two-step random access, RA, procedure, the fallback RAR indicating a switch to a four-step RA procedure;

responsive to receiving the fallback RAR, determining (1720) to transmit Msg3 using repetition based on receiving the fallback RAR; and responsive to determining to transmit the information using repetition, transmitting (1730) Msg3 to the network node using repetition.

Embodiment 15. A method of operating a communication device in a communications network, the method comprising:

determining (1820) to transmit information using repetition to a network node operating in the communications network during a random access, RA, procedure;

determining (1830) a subset of preambles based on determining to transmit the information using repetition;

responsive to determining the subset of preambles, determining (1835) a preamble of the subset of preambles to transmit to the network node to indicate a type of the repetition;

transmitting (1840) the preamble to the network node; and transmitting (1850) the information using repetition to the network node.

Embodiment 16. The method of Embodiment 15, wherein the information is Msg3 information, and wherein transmitting the information to the network node comprises transmitting the information via a physical uplink shared channel, PUSCH.

Embodiment 17. The method of Embodiment 15, wherein the RA procedure is a two-step RA procedure, wherein the information is MsgA information, wherein determining to transmit the MsgA information using repetition comprises determining to transmit the MsgA information using repetition based on the RA procedure being a two-step RA procedure, and wherein transmitting the information to the network node comprises transmitting the information via a physical uplink shared channel, PUSCH.

Embodiment 18. The method of any of Embodiments 15-17, wherein determining to transmit the information using repetition comprises:

determining a tentative transmit power for transmitting the information is greater than a maximum transmit power of the communication device; and determining to transmit the information using repetition based on the tentative transmit power being greater than the maximum transmit power.

Embodiment 19. The method of any of Embodiments 15-18, further comprising:

receiving (1810), a system information block, SIB, from the network node indicating a maximum number of repetitions, wherein transmitting the information using repetition comprises transmitting a number of repetitions of the information based on the maximum number of repetitions.

Embodiment 20. A method of operating a communication device in a communications network, the method comprising:

receiving (1910) a system information block, SIB, from a network node operating in the communications network, the SIB including an indication indicating to transmit Msg3 using repetition during a random access, RA, procedure according to a radio access stratum release;

transmitting (1920) a RA preamble to the network node to initiate the RA procedure;

receiving (1930) a random access response, RAR, from the network node; and responsive to receiving the RAR, transmitting (1940) the Msg3 using repetition based on the indication.

Embodiment 21. The method of Embodiment 20, wherein the radio access stratum release is a first release, and wherein the communication device supports a second release that is different than the first release.

Embodiment 22. The method of any of Embodiments 20-21, wherein the indication further indicates a number of repetitions to be used for Msg3 transmissions, and wherein transmitting the Msg3 using repetition based on the indication further comprises transmitting the Msg3 repeatedly based on the number.

Embodiment 23. A method of operating a network node in a communications network, the method comprising:

transmitting (2020) a random access response, RAR, to a communication device in the communications network during a random access, RA, procedure, the RAR including a single indicator to jointly indicate to the communication device to transmit information to the network node using repetition and frequency hopping;

responsive to transmitting the RAR, repeatedly receiving (2040) the information from the communication device using multiple sets of frequency resources.

Embodiment 24. The method of Embodiment 23, wherein the information is Msg3 information, and wherein receiving the Msg3 information comprises receiving the information via a physical uplink shared channel, PUSCH.

Embodiment 25. The method of any of Embodiments 23-24, further comprising:

transmitting (2010), prior to transmitting the RAR, system information indicating a number of repetitions of the information and instructions on when to change a frequency used to transmit the repetitions of the information.

Embodiment 26. The method of any of Embodiments 23-25, wherein the single indicator comprises a frequency hopping flag field with a length of one bit.

Embodiment 27. The method of any of Embodiments 23-26, further comprising:

transmitting (2030), a second indication to the communication device indicating slots to skip during transmission of the information.

Embodiment 28. The method of Embodiment 27, wherein the second indication comprises a bitmap.

Embodiment 29. The method of any of Embodiments 27-28, wherein the second indication further indicates a pattern of slots to skip.

Embodiment 30. The method of any of Embodiments 23-29, further comprising:

responsive to receiving a portion of the information, transmitting (2050) an indication to the communication device indicating to terminate repetition.

Embodiment 31. A method of operating a network node in a communications network, the method comprising:

receiving (2120) a preamble from a communication device during a random access, RA, procedure;

determining (2130) whether the communication device will transmit information using repetition based on a subset of preambles associated with the preamble; and receiving (2140) the information from the communication device.

Embodiment 32. The method of Embodiment 31, wherein the information is Msg3 information, and wherein determining whether the communication device will transmit information using repetition based on the subset of preambles associated with the preamble comprises determining a number of times the Msg3 information will be transmitted by the communication device based on the subset of preambles.

Embodiment 33. The method of any of Embodiments 31-32, further comprising:

transmitting (2110) a system information block, SIB, to the network node indicating a maximum number of repetitions.

Embodiment 34. A method of operating a network node in a communications network, the method comprising:

transmitting (2210) a system information block, SIB, to a communication device operating in the communications network, the SIB including an indication indicating to transmit Msg3 using repetition during a revised random access, RA procedure that is associated with a first radio access stratum release;

receiving (2220) a RA preamble from the communication device initiating the revised RA procedure;

transmitting (2230) a random access response, RAR, to the communication device, wherein the RAR is usable by communication devices associated with a second release that is different than the first release; and receiving (2240) the Msg3 from the communication device.

Embodiment 35. A communication device (1300) operating in a communications network, the network node comprising:

processing circuitry (1303); and memory (1305) coupled with the processing circuitry, wherein the memory includes instructions that when executed by the processing circuitry causes the communication device to perform operations, the operations comprising:

receiving (1620) a random access response, RAR, from a network node in the communications network during a random access, RA, procedure, the RAR including a single indicator that jointly indicates whether to transmit information to the network node using repetition and frequency hopping;

determining (1630) to transmit the information using repetition and frequency hopping based on the single indicator; and responsive to determining to transmit the information using repetition and frequency hopping, transmitting (1650) the information to the network node.

Embodiment 36. The communication device of Embodiment 35, wherein the information is Msg3 information, and wherein transmitting the information to the network node comprises transmitting the information via a physical uplink shared channel, PUSCH.

Embodiment 37. The communication device of any of Embodiments 35-36, wherein determining whether to transmit the information using repetition and frequency hopping comprises determining to transmit the information using repetition and frequency hopping, wherein transmitting the information comprises transmitting the information using repetition by transmitting a plurality of transmissions to the network node, each transmission of the plurality transmissions conveying a same set of information bits, and wherein transmitting the information using frequency hopping comprises transmitting a first transmission and a second transmission using different frequency resources.

Embodiment 38. The communication device of Embodiment 37, wherein the plurality of transmissions includes the first transmission and the second transmission, and wherein transmitting the first transmission and the second transmission using different frequency resources comprises transmitting a first transmission of the plurality of transmissions using first frequency resources and transmitting a second transmission of the plurality of transmissions using second frequency resources that are different than the first frequency resources.

Embodiment 39. The communication device of Embodiment 38, wherein transmitting the first transmission and the second transmission using different frequency resources further comprises:

determining that the first transmission and the second transmission share a hybrid automatic repeat request, HARQ, redundancy version; and determining to transmit the first transmission and the second transmission using different frequency resources based on determining that the first transmission and the second transmission share the HARQ redundancy version.

Embodiment 40. The communication device of Embodiment 37, wherein the plurality of transmissions is a first plurality of transmissions including the first transmission, wherein the set of information bits is a first set of information bits, and wherein transmitting a first transmission and a second transmission using different frequency resources comprises transmitting each transmission of the first plurality of transmissions using a first frequency and transmitting each transmission of a second plurality of transmissions that includes the second transmission using a second frequency that is different than the first frequency, each transmission of the second plurality of transmissions conveying a same second set of information bits that are different than the first set of information bits.

Embodiment 41. The communication device of any of Embodiments 37-40, the operations further comprising:

receiving (1610), prior to receiving the RAR, system information indicating a number of transmission in the plurality of transmissions and instructions on when to change a frequency used to transmit the plurality of transmissions.

Embodiment 42. The communication device of any of Embodiments 37-41, wherein the single indicator comprises an indication of a number of transmissions in the plurality of transmissions, wherein determining to transmit the information using repetition and frequency hopping comprises:

determining that the number is greater than one based on the bit; and determining to transmit the information using repetition and frequency hopping based on the number being greater than one.

Embodiment 43. The communication device of any of Embodiments 35-42, wherein the single indicator comprises a frequency hopping flag field with a length of one bit.

Embodiment 44. The communication device of any of Embodiments 35-43, the operations further comprising:

receiving (1640), a second indication from the network node indicating slots to skip during transmission of the information, wherein transmitting the information further comprises transmitting the information during non-skipped slots.

Embodiment 45. The communication device of Embodiment 44, wherein the second indication comprises a bitmap.

Embodiment 46. The communication device of any of Embodiments 44-45, wherein the second indication further indicates a pattern of slots to skip.

Embodiment 47. The communication device of any of Embodiments 35-46, the operations further comprising:

responsive to transmitting a portion of the information, receiving a second indication from the network node indicating to terminate repetition.

Embodiment 48. A communication device (1300) operating in a communications network adapted to perform operations, the operations comprising:

- receiving (1620) a random access response, RAR, from a network node in the communications network during a random access, RA, procedure, the RAR including a single indicator that jointly indicates whether to transmit information to the network node using repetition and frequency hopping;
- determining (1630) to transmit the information using repetition and frequency hopping based on the single indicator; and
- responsive to determining to transmit the information using repetition and frequency hopping, transmitting (1650) the information to the network node.

Embodiment 49. The communication device of Embodiment 48 further adapted to perform according to any of Embodiments 2-13.

Embodiment 50. A computer program comprising program code to be executed by processing circuitry (1303) of a communication device (1300) operating in a communications network, whereby execution of the program code causes the communication device to perform operations, the operations comprising:

- receiving (1620) a random access response, RAR, from a network node in the communications network during a random access, RA, procedure, the RAR including a single indicator that jointly indicates whether to transmit information to the network node using repetition and frequency hopping;
- determining (1630) to transmit the information using repetition and frequency hopping based on the single indicator; and
- responsive to determining to transmit the information using repetition and frequency hopping, transmitting (1650) the information to the network node.

Embodiment 51. The computer program of Embodiment 50 whereby execution of the program code causes the communication device to perform operations according to any of Embodiments 2-13.

Embodiment 52. A computer program product comprising a non-transitory storage medium including program code to be executed by processing circuitry (1303) of a communication device (1300) operating in a communications network, whereby execution of the program code causes the communication device to perform operations, the operations comprising:

- receiving (1620) a random access response, RAR, from a network node in the communications network during a random access, RA, procedure, the RAR including a single indicator that jointly indicates whether to transmit information to the network node using repetition and frequency hopping;
- determining (1630) to transmit the information using repetition and frequency hopping based on the single indicator; and
- responsive to determining to transmit the information using repetition and frequency hopping, transmitting (1650) the information to the network node.

Embodiment 53. The computer program product of Embodiment 52, whereby execution of the program code causes the network node to perform operations according to any of Embodiments 2-13.

Embodiment 54. A communication device (1300) operating in a communications network, the network node comprising:

- processing circuitry (1303); and
- memory (1305) coupled with the processing circuitry, wherein the memory includes instructions that when executed by the processing circuitry causes the communication device to perform operations, the operations comprising:
- receiving (1710) a fallback random access response, RAR, from a network node in the communications network during a two-step random access, RA, procedure, the fallback RAR indicating a switch to a four-step RA procedure;
- responsive to receiving the fallback RAR, determining (1720) to transmit Msg3 using repetition based on receiving the fallback RAR; and
- responsive to determining to transmit the information using repetition, transmitting (1730) Msg3 to the network node using repetition.

Embodiment 55. A communication device (1300) operating in a communications network adapted to perform operations, the operations comprising:

- receiving (1710) a fallback random access response, RAR, from a network node in the communications network during a two-step random access, RA, procedure, the fallback RAR indicating a switch to a four-step RA procedure;
- responsive to receiving the fallback RAR, determining (1720) to transmit Msg3 using repetition based on receiving the fallback RAR; and
- responsive to determining to transmit the information using repetition, transmitting (1730) Msg3 to the network node using repetition.

Embodiment 56. A computer program comprising program code to be executed by processing circuitry (1303) of a communication device (1300) operating in a communications network, whereby execution of the program code causes the communication device to perform operations, the operations comprising:

- receiving (1710) a fallback random access response, RAR, from a network node in the communications network during a two-step random access, RA, procedure, the fallback RAR indicating a switch to a four-step RA procedure;
- responsive to receiving the fallback RAR, determining (1720) to transmit Msg3 using repetition based on receiving the fallback RAR; and
- responsive to determining to transmit the information using repetition, transmitting (1730) Msg3 to the network node using repetition.

Embodiment 57. A computer program product comprising a non-transitory storage medium including program code to be executed by processing circuitry (1303) of a communication device (1300) operating in a communications network, whereby execution of the program code causes the communication device to perform operations, the operations comprising:

- receiving (1710) a fallback random access response, RAR, from a network node in the communications network during a two-step random access, RA, procedure, the fallback RAR indicating a switch to a four-step RA procedure;
- responsive to receiving the fallback RAR, determining (1720) to transmit Msg3 using repetition based on receiving the fallback RAR; and
- responsive to determining to transmit the information using repetition, transmitting (1730) Msg3 to the network node using repetition.

Embodiment 58. A communication device (1300) operating in a communications network, the network node comprising:

processing circuitry (1303); and memory (1305) coupled with the processing circuitry, wherein the memory includes instructions that when executed by the processing circuitry causes the communication device to perform operations, the operations comprising:

determining (1820) to transmit information using repetition to a network node operating in the communications network during a random access, RA, procedure;

determining (1830) a subset of preambles based on determining to transmit the information using repetition;

responsive to determining the subset of preambles, determining (1835) a preamble of the subset of preambles to transmit to the network node to indicate the type of the repetition;

transmitting (1840) the preamble to the network node; and transmitting (1850) the information using repetition to the network node.

Embodiment 59. The communication device of Embodiment 58, wherein the information is Msg3 information, and wherein transmitting the information to the network node comprises transmitting the information via a physical uplink shared channel, PUSCH.

Embodiment 60. The communication device of Embodiment 58, wherein the RA procedure is a two-step RA procedure, wherein the information is MsgA information, wherein determining to transmit the MsgA information using repetition comprises determining to transmit the MsgA information using repetition based on the RA procedure being a two-step RA procedure, and wherein transmitting the information to the network node comprises transmitting the information via a physical uplink shared channel, PUSCH.

Embodiment 61. The communication device of any of Embodiments 58-60, wherein determining to transmit the information using repetition comprises:

determining a tentative transmit power for transmitting the information is greater than a maximum transmit power of the communication device; and determining to transmit the information using repetition based on the tentative transmit power being greater than the maximum transmit power.

Embodiment 62. The communication device of any of Embodiments 58-61, the operations further comprising:

receiving (1810), a system information block, SIB, from the network node indicating a maximum number of repetitions, wherein transmitting the information using repetition comprises transmitting a number of repetitions of the information based on the maximum number of repetitions.

Embodiment 63. A communication device (1300) operating in a communications network adapted to perform operations, the operations comprising:

determining (1820) to transmit information using repetition to a network node operating in the communications network during a random access, RA, procedure;

determining (1830) a subset of preambles based on determining to transmit the information using repetition;

responsive to determining the subset of preambles, determining (1835) a preamble of the subset of preambles to transmit to the network node to indicate the type of the repetition;

transmitting (1840) the preamble to the network node; and transmitting (1850) the information using repetition to the network node.

Embodiment 64. The communication device of Embodiment 63 further adapted to perform according to any of Embodiments 16-19.

Embodiment 65. A computer program comprising program code to be executed by processing circuitry (1303) of a communication device (1300) operating in a communications network, whereby execution of the program code causes the communication device to perform operations, the operations comprising:

determining (1820) to transmit information using repetition to a network node operating in the communications network during a random access, RA, procedure;

determining (1830) a subset of preambles based on determining to transmit the information using repetition;

responsive to determining the subset of preambles, determining (1835) a preamble of the subset of preambles to transmit to the network node to indicate the type of the repetition;

transmitting (1840) the preamble to the network node; and transmitting (1850) the information using repetition to the network node.

Embodiment 66. The computer program of Embodiment 65 whereby execution of the program code causes the communication device to perform operations according to any of Embodiments 16-19.

Embodiment 67. A computer program product comprising a non-transitory storage medium including program code to be executed by processing circuitry (1303) of a communication device (1300) operating in a communications network, whereby execution of the program code causes the communication device to perform operations, the operations comprising:

determining (1820) to transmit information using repetition to a network node operating in the communications network during a random access, RA, procedure;

determining (1830) a subset of preambles based on determining to transmit the information using repetition;

responsive to determining the subset of preambles, determining (1835) a preamble of the subset of preambles to transmit to the network node to indicate the type of the repetition;

transmitting (1840) the preamble to the network node; and transmitting (1850) the information using repetition to the network node.

Embodiment 68. The computer program product of Embodiment 67, whereby execution of the program code causes the network node to perform operations according to any of Embodiments 16-19.

Embodiment 69. A communication device (1300) operating in a communications network, the network node comprising:

processing circuitry (1303); and memory (1305) coupled with the processing circuitry, wherein the memory includes instructions that when executed by the processing circuitry causes the communication device to perform operations, the operations comprising:

receiving (1910) a system information block, SIB, from a network node operating in the communications network, the SIB including an indication indicating to transmit Msg3 using repetition during a random access, RA, procedure according to a radio access stratum release;

transmitting (1920) a RA preamble to the network node to initiate the RA procedure;

receiving (1930) a random access response, RAR, from the network node; and responsive to receiving the RAR, transmitting (1940) the Msg3 using repetition based on the indication.

Embodiment 70. The communication device of Embodiment 69, wherein the radio access stratum release is a first release, and wherein the communication device supports a second release that is different than the first release.

Embodiment 71. The communication device of any of Embodiments 69-70, wherein the indication further indicates a number of repetitions to be used for Msg3 transmissions, and wherein transmitting the Msg3 using repetition based on the indication further comprises transmitting the Msg3 repeatedly based on the number.

Embodiment 72. A communication device (1300) operating in a communications network adapted to perform operations, the operations comprising:

receiving (1910) a system information block, SIB, from a network node operating in the communications network, the SIB including an indication indicating to transmit Msg3 using repetition during a random access, RA, procedure according to a radio access stratum release;

transmitting (1920) a RA preamble to the network node to initiate the RA procedure;

receiving (1930) a random access response, RAR, from the network node; and responsive to receiving the RAR, transmitting (1940) the Msg3 using repetition based on the indication.

Embodiment 73. The communication device of Embodiment 72 further adapted to perform according to any of Embodiments 21-22.

Embodiment 74. A computer program comprising program code to be executed by processing circuitry (1303) of a communication device (1300) operating in a communications network, whereby execution of the program code causes the communication device to perform operations, the operations comprising:

receiving (1910) a system information block, SIB, from a network node operating in the communications network, the SIB including an indication indicating to transmit Msg3 using repetition during a random access, RA, procedure according to a radio access stratum release;

transmitting (1920) a RA preamble to the network node to initiate the RA procedure;

receiving (1930) a random access response, RAR, from the network node; and responsive to receiving the RAR, transmitting (1940) the Msg3 using repetition based on the indication.

Embodiment 75. The computer program of Embodiment 74 whereby execution of the program code causes the communication device to perform operations according to any of Embodiments 21-22.

Embodiment 76. A computer program product comprising a non-transitory storage medium including program code to be executed by processing circuitry (1303) of a communication device (1300) operating in a communications network, whereby execution of the program code causes the communication device to perform operations, the operations comprising:

receiving (1910) a system information block, SIB, from a network node operating in the communications network, the SIB including an indication indicating to transmit Msg3 using repetition during a random access, RA, procedure according to a radio access stratum release;

transmitting (1920) a RA preamble to the network node to initiate the RA procedure;

receiving (1930) a random access response, RAR, from the network node; and responsive to receiving the RAR, transmitting (1940) the Msg3 using repetition based on the indication.

Embodiment 77. The computer program product of Embodiment 75, whereby execution of the program code causes the network node to perform operations according to any of Embodiments 21-22.

Embodiment 78. A network node (1400) operating in a communications network, the network node comprising:

processing circuitry (1403); and memory (1405) coupled with the processing circuitry, wherein the memory includes instructions that when executed by the processing circuitry causes the network node to perform operations, the operations comprising:

transmitting (2020) a random access response, RAR, to a communication device in the communications network during a random access, RA, procedure, the RAR including a single indicator to jointly indicate to the communication device to transmit information to the network node using repetition and frequency hopping;

responsive to transmitting the RAR, repeatedly receiving (2040) the information from the communication device using multiple sets of frequency resources.

Embodiment 79. The network node of Embodiment 78, wherein the information is Msg3 information, and wherein receiving the Msg3 information comprises receiving the information via a physical uplink shared channel, PUSCH.

Embodiment 80. The network node of any of Embodiments 78-79, the operations further comprising:

transmitting (2010), prior to transmitting the RAR, system information indicating a number of repetitions of the information and instructions on when to change a frequency used to transmit the repetitions of the information.

Embodiment 81. The network node of any of Embodiments 78-80, wherein the single indicator comprises a frequency hopping flag field with a length of one bit.

Embodiment 82. The network node of any of Embodiments 78-81, the operations further comprising:

transmitting (2030), a second indication to the communication device indicating slots to skip during transmission of the information.

Embodiment 83. The network node of Embodiment 82, wherein the second indication comprises a bitmap.

Embodiment 84. The network node d of any of Embodiments 82-83, wherein the second indication further indicates a pattern of slots to skip.

Embodiment 85. The network node of any of Embodiments 78-84, the operations further comprising:

responsive to receiving a portion of the information, transmitting (2050) an indication to the communication device indicating to terminate repetition.

Embodiment 86. A network node (1400) operating in a communications network adapted to perform operations, the operations comprising:

transmitting (2020) a random access response, RAR, to a communication device in the communications network during a random access, RA, procedure, the RAR including a single indicator to jointly indicate to the communication device to transmit information to the network node using repetition and frequency hopping;

responsive to transmitting the RAR, repeatedly receiving (2040) the information from the communication device using multiple sets of frequency resources.

Embodiment 87. The network node of Embodiment 86 further adapted to perform according to any of Embodiments 24-30.

Embodiment 88. A computer program comprising program code to be executed by processing circuitry (1403) of a network node (1400) operating in a communications network, whereby execution of the program code causes the network node to perform operations, the operations comprising:

transmitting (2020) a random access response, RAR, to a communication device in the communications network during a random access, RA, procedure, the RAR including a single indicator to jointly indicate to the communication device to transmit information to the network node using repetition and frequency hopping;

responsive to transmitting the RAR, repeatedly receiving (2040) the information from the communication device using multiple sets of frequency resources.

Embodiment 89. The computer program of Embodiment 88 whereby execution of the program code causes the network node to perform operations according to any of Embodiment 24-30.

Embodiment 90. A computer program product comprising a non-transitory storage medium including program code to be executed by processing circuitry (1403) of a network node (1400) operating in a communications network, whereby execution of the program code causes the network node to perform operations, the operations comprising:

transmitting (2020) a random access response, RAR, to a communication device in the communications network during a random access, RA, procedure, the RAR including a single indicator to jointly indicate to the communication device to transmit information to the network node using repetition and frequency hopping;

responsive to transmitting the RAR, repeatedly receiving (2040) the information from the communication device using multiple sets of frequency resources.

Embodiment 91. The computer program product of Embodiment 90, whereby execution of the program code causes the network node to perform operations according to any of Embodiments 24-30.

Embodiment 92. A network node (1400) operating in a communications network, the network node comprising:

processing circuitry (1403); and memory (1405) coupled with the processing circuitry, wherein the memory includes instructions that when executed by the processing circuitry causes the network node to perform operations, the operations comprising:

receiving (2120) a preamble from a communication device during a random access, RA, procedure;

determining (2130) whether the communication device will transmit information using repetition based on a subset of preambles associated with the preamble; and receiving (2140) the information from the communication device.

Embodiment 93. The network node of Embodiment 92, wherein the information is Msg3 information, and wherein determining whether the communication device will transmit information using repetition based on the subset of preambles associated with the preamble comprises determining a number of times the Msg3 information will be transmitted by the communication device based on the subset of preambles.

Embodiment 94. The network node of any of Embodiments 92-93, the operations further comprising:

transmitting (2110) a system information block, SIB, to the network node indicating a maximum number of repetitions.

Embodiment 95. A network node (1400) operating in a communications network adapted to perform operations, the operations comprising:

receiving (2120) a preamble from a communication device during a random access, RA, procedure;

determining (2130) whether the communication device will transmit information using repetition based on a subset of preambles associated with the preamble; and receiving (2140) the information from the communication device.

Embodiment 96. The network node of Embodiment 95 further adapted to perform according to any of Embodiment 32-33.

Embodiment 97. A computer program comprising program code to be executed by processing circuitry (1403) of a network node (1400) operating in a communications network, whereby execution of the program code causes the network node to perform operations, the operations comprising:

receiving (2120) a preamble from a communication device during a random access, RA, procedure;

determining (2130) whether the communication device will transmit information using repetition based on a subset of preambles associated with the preamble; and receiving (2140) the information from the communication device.

Embodiment 98. The computer program of Embodiment 97 whereby execution of the program code causes the network node to perform operations according to any of Embodiments 32-33.

Embodiment 99. A computer program product comprising a non-transitory storage medium including program code to be executed by processing circuitry (1403) of a network node (1400) operating in a communications network, whereby execution of the program code causes the network node to perform operations, the operations comprising:

receiving (2120) a preamble from a communication device during a random access, RA, procedure;

determining (2130) whether the communication device will transmit information using repetition based on a subset of preambles associated with the preamble; and receiving (2140) the information from the communication device.

Embodiment 100. The computer program product of Embodiment 99, whereby execution of the program code causes the network node to perform operations according to any of Embodiments 32-33.

Embodiment 101. A network node (1400) operating in a communications network, the network node comprising:

processing circuitry (1403); and memory (1405) coupled with the processing circuitry, wherein the memory includes instructions that when executed by the processing circuitry causes the network node to perform operations, the operations comprising:

transmitting (2210) a system information block, SIB, to a communication device operating in the communications network, the SIB including an indication indicating to transmit Msg3 using repetition during a revised random access, RA procedure that is associated with a first radio access stratum release;

receiving (2220) a RA preamble from the communication device initiating the revised RA procedure;

transmitting (2230) a random access response, RAR, to the communication device, wherein the RAR is usable by communication devices associated with a second release that is different than the first release; and receiving (2240) the Msg3 from the communication device.

Embodiment 102. A network node (1400) operating in a communications network adapted to perform operations, the operations comprising:

transmitting (2210) a system information block, SIB, to a communication device operating in the communications network, the SIB including an indication indicating to transmit Msg3 using repetition during a revised random access, RA procedure that is associated with a first radio access stratum release;

receiving (2220) a RA preamble from the communication device initiating the revised RA procedure;

transmitting (2230) a random access response, RAR, to the communication device, wherein the RAR is usable by communication devices associated with a second release that is different than the first release; and receiving (2240) the Msg3 from the communication device.

Embodiment 103. A computer program comprising program code to be executed by processing circuitry (1403) of a network node (1400) operating in a communications network, whereby execution of the program code causes the network node to perform operations, the operations comprising:

transmitting (2210) a system information block, SIB, to a communication device operating in the communications network, the SIB including an indication indicating to transmit Msg3 using repetition during a revised random access, RA procedure that is associated with a first radio access stratum release;

receiving (2220) a RA preamble from the communication device initiating the revised RA procedure;

transmitting (2230) a random access response, RAR, to the communication device, wherein the RAR is usable by communication devices associated with a second release that is different than the first release; and receiving (2240) the Msg3 from the communication device.

Embodiment 104. A computer program product comprising a non-transitory storage medium including program code to be executed by processing circuitry (1403) of a network node (1400) operating in a communications network, whereby execution of the program code causes the network node to perform operations, the operations comprising:

transmitting (2210) a system information block, SIB, to a communication device operating in the communications network, the SIB including an indication indicating to transmit Msg3 using repetition during a revised random access, RA procedure that is associated with a first radio access stratum release;

receiving (2220) a RA preamble from the communication device initiating the revised RA procedure;

transmitting (2230) a random access response, RAR, to the communication device, wherein the RAR is usable by communication devices associated with a second release that is different than the first release; and receiving (2240) the Msg3 from the communication device.

Some abbreviations used above are described below.

Abbreviation Explanation

BS Base station
CRC Cyclic Redundancy Check
CRM Contention Resolution Message
DCI Downlink Control Information
DL Downlink
DM-RS Demodulation Reference Signal
eMTC Enhanced Machine Type Communication
FH Frequency Hopping
FR1 Frequency Range 1
FR2 Frequency Range 2
HARQ Hybrid Automated Retransmission Request
MAC Medium Access Control
Msg3 Message 3
NB-IoT Narrow-Band Internet of Things
NR-U NR unlicensed
PDCCH Physical Downlink Control Channel
PUSCH Physical Uplink Shared Data Channel
PRACH Physical Random Access Channel
PRB Physical Resource Block, i.e. 12 consecutive sub-carriers
RACH Random Access Channel
RA Random Access
RAR Random Access Response
RO PRACH occasion
RSRP Reference Signal Received Power
TB Transport Block
RNTI Radio Network Temporary Identifier
TxD Transmit Diversity
UE User Equipment
UL Uplink
gNB (Base station)

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 23 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 23. For simplicity, the wireless network of FIG. 23 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 23, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 23 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 23 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (I) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 24:
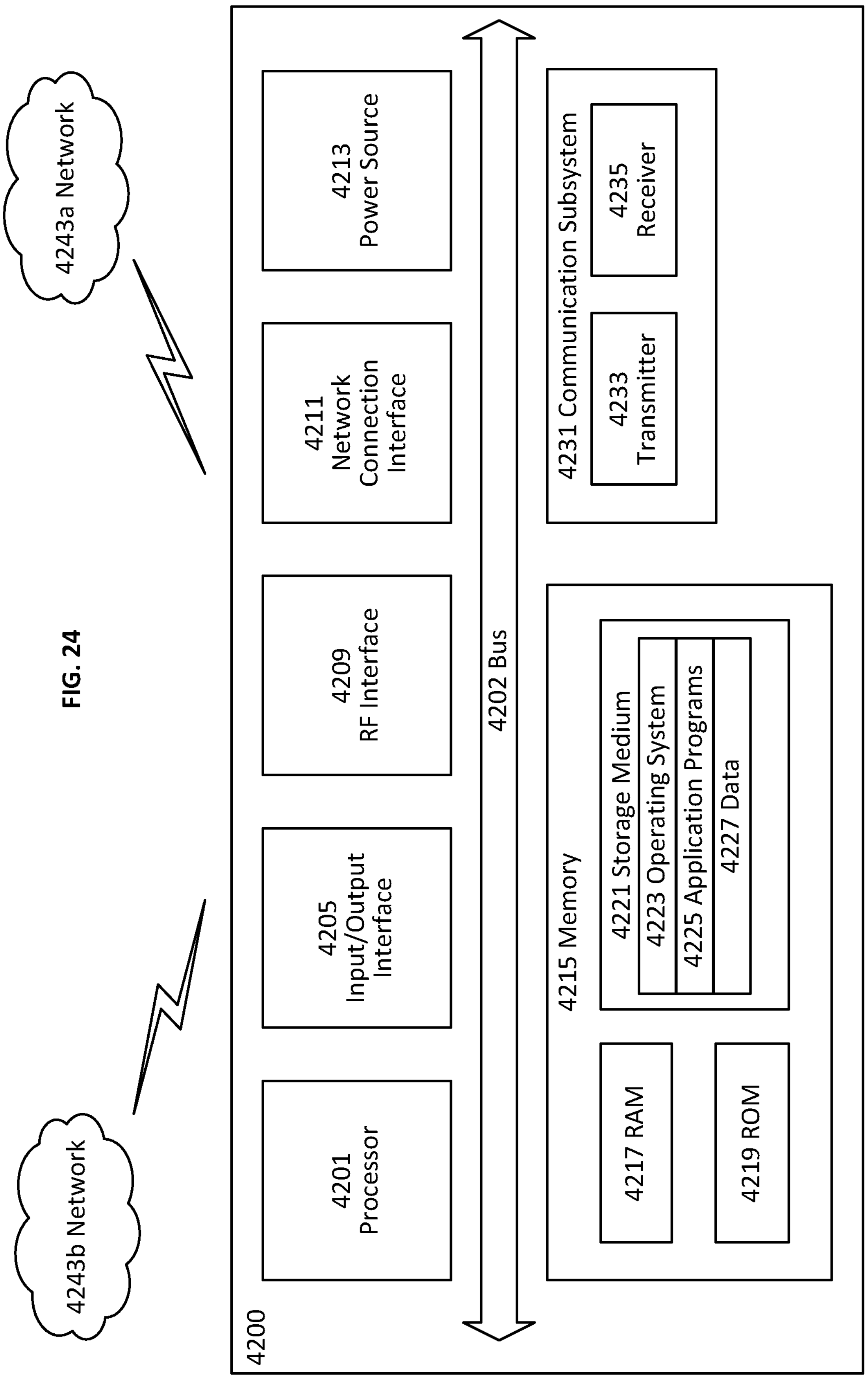
FIG. 24 is a block diagram of a user equipment in accordance with some embodiments.

FIG. 24 illustrates a user Equipment in accordance with some embodiments.

FIG. 24 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 24, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 24 is a UE, the components discussed herein are equally applicable to a WD, and vice-versa.

In FIG. 24, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 24, or only a subset of the components. The level of integration between the components may vary from one UE to another UE. Further, certain UEs may contain multiple instances of a component, such as multiple processors, memories, transceivers, transmitters, receivers, etc.

In FIG. 24, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 24, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 24, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 25:
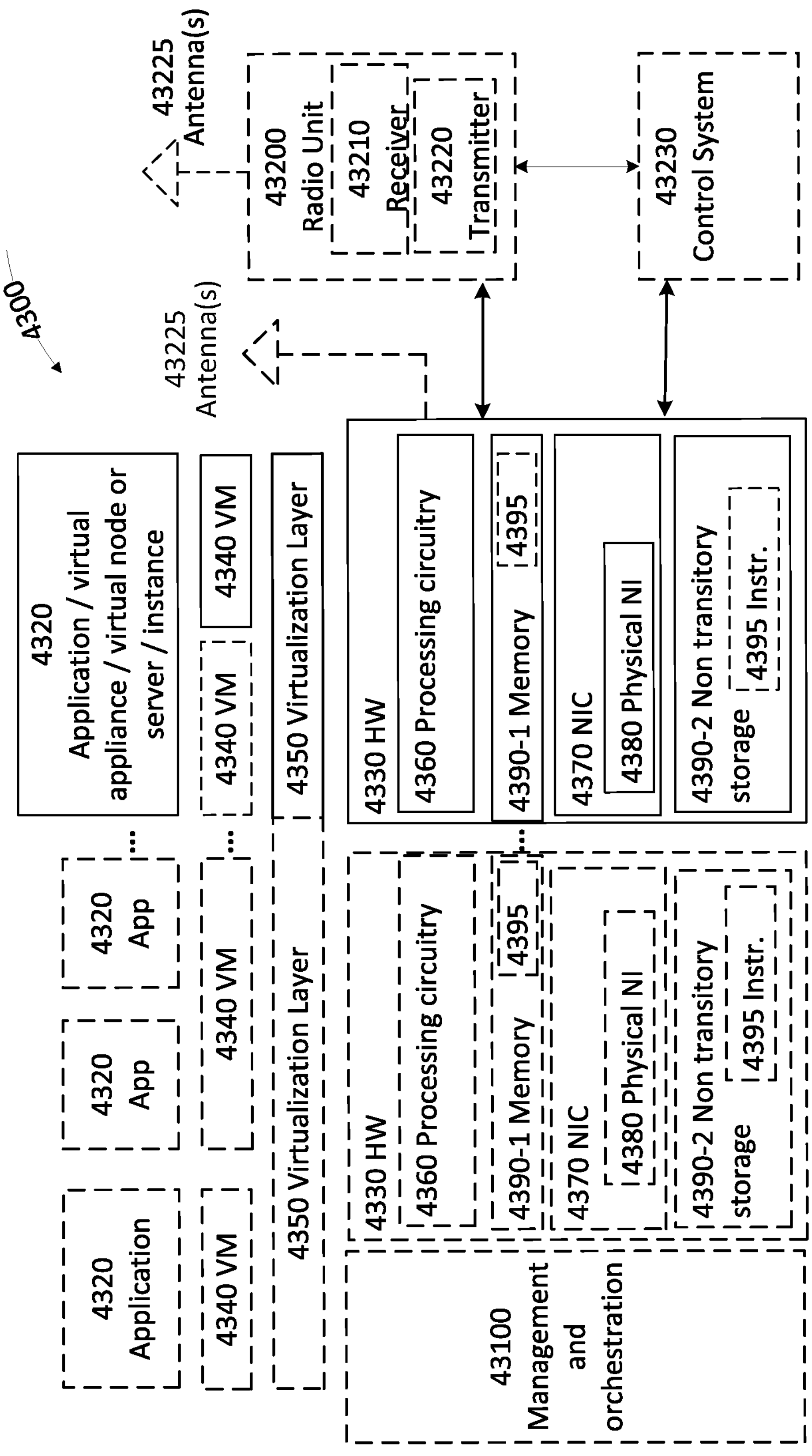
FIG. 25 is a block diagram of a virtualization environment in accordance with some embodiments.

FIG. 25 illustrates a virtualization environment in accordance with some embodiments.

FIG. 25 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 25, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 25.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 26:
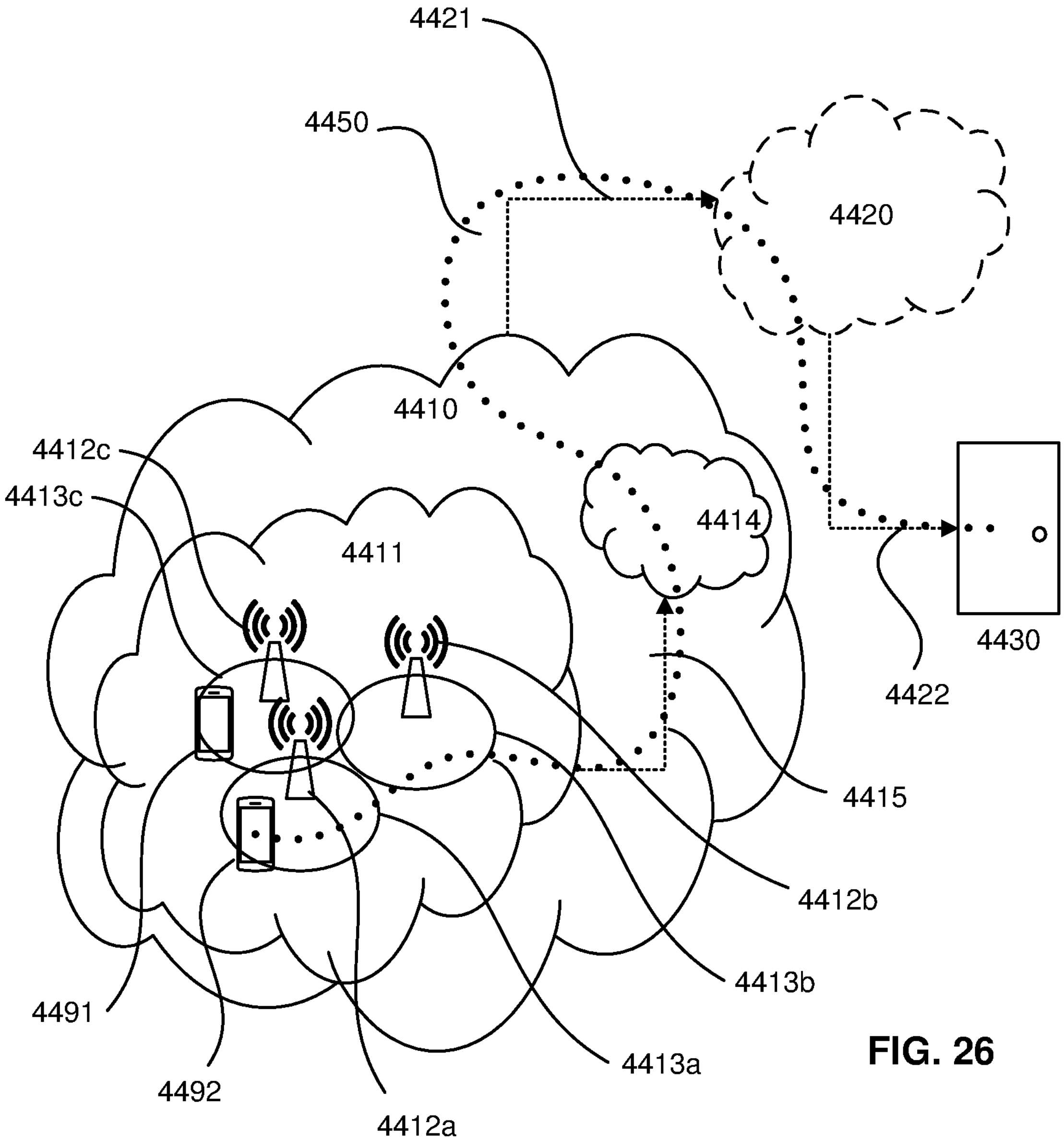
FIG. 26 is a block diagram of a telecommunication network connected via an intermediate network to a host computer in accordance with some embodiments.

FIG. 26 illustrates a telecommunication network connected via an intermediate network to a host computer in accordance with some embodiments.

With reference to FIG. 26, in accordance with an embodiment, a communication system includes telecommunication network 4410, such as a 3GPP-type cellular network, which comprises access network 4411, such as a radio access network, and core network 4414. Access network 4411 comprises a plurality of base stations **4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412**.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 26 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 27:
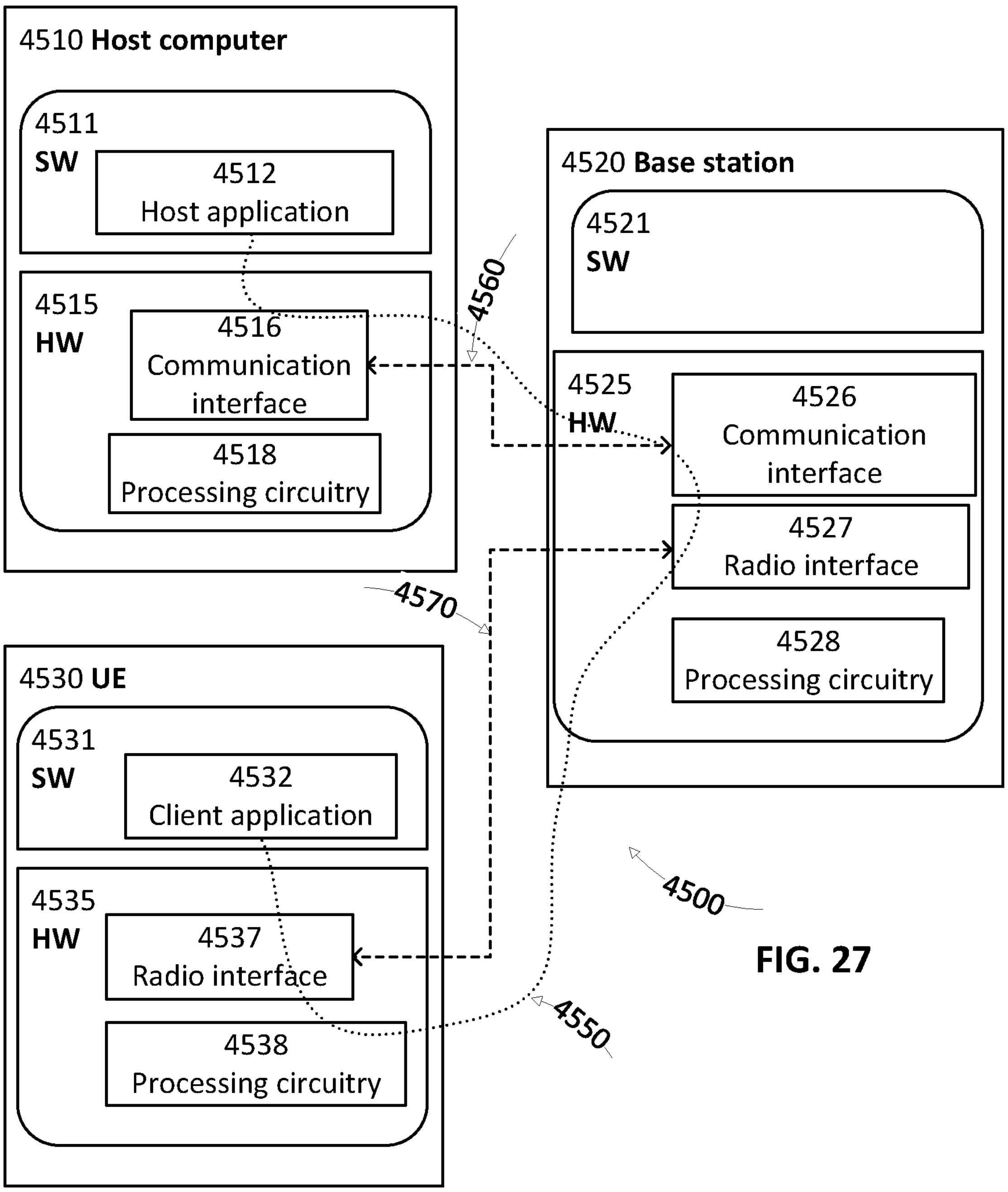
FIG. 27 is a block diagram of a host computer communicating via a base station with a user equipment over a partially wireless connection in accordance with some embodiments.

FIG. 27 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 27. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 27) served by base station 4520. Communication interface 4526 may be configured to facilitate connection 4560 to host computer 4510. Connection 4560 may be direct or it may pass through a core network (not shown in FIG. 27) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 27 may be similar or identical to host computer 4430, one of base stations 4412*a*, 4412*b*, 4412*c* and one of UEs 4491, 4492 of FIG. 26, respectively. This is to say, the inner workings of these entities may be as shown in FIG. 27 and independently, the surrounding network topology may be that of FIG. 26.

In FIG. 27, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 28:
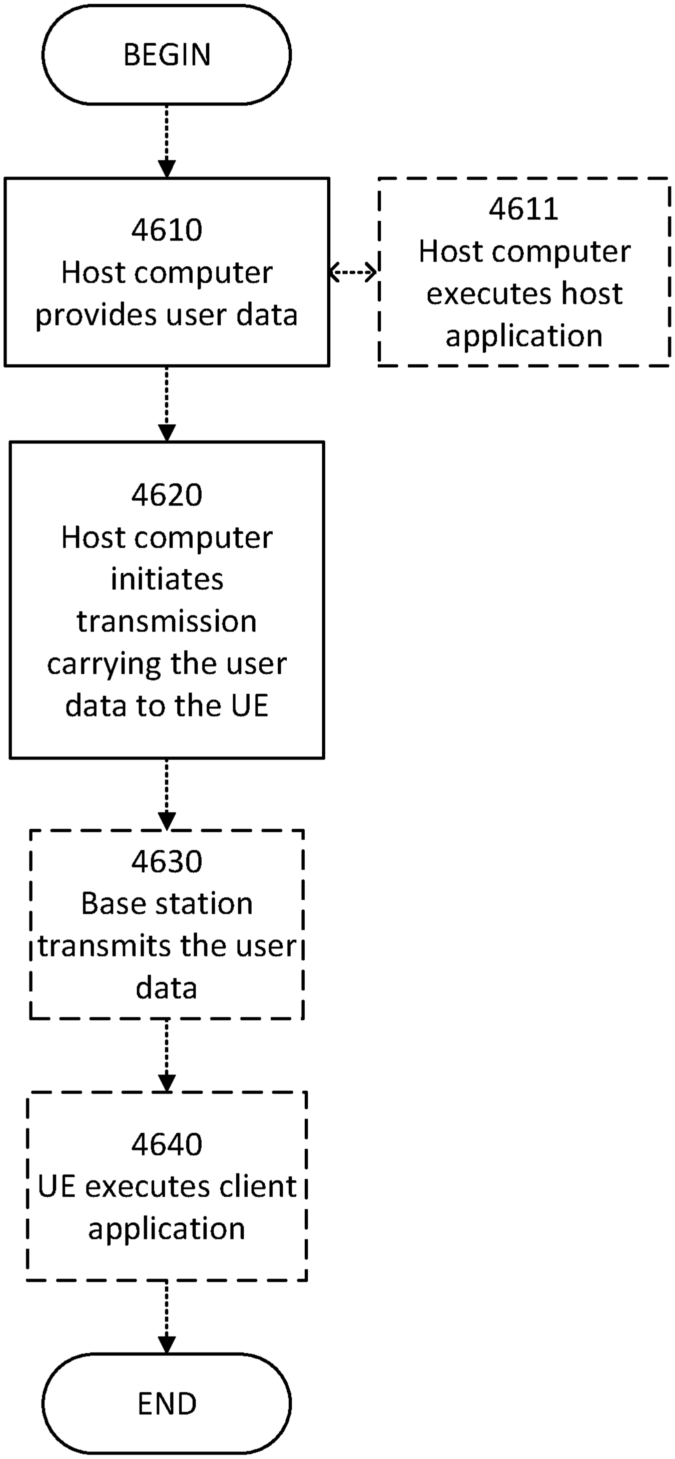
FIG. 28 is a block diagram of methods implemented in a communication system including a host computer, a base station, and a user equipment in accordance with some embodiments.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 15-16. For simplicity of the present disclosure, only drawing references to FIG. 28 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 29:
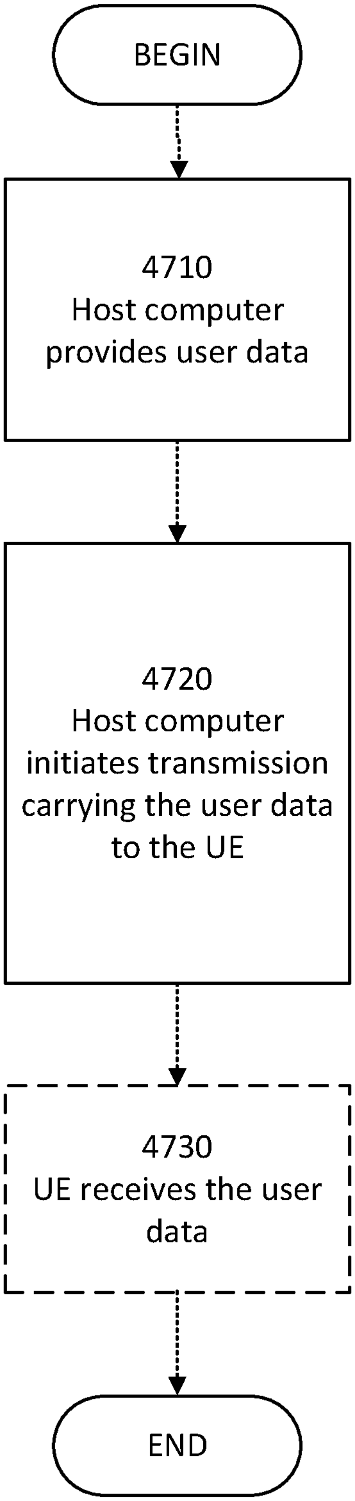
FIG. 29 is a block diagram of methods implemented in a communication system including a host computer, a base station, and a user equipment in accordance with some embodiments.

FIG. 29 illustrates methods implemented in a communication system including a host computer, a base station and a user equipment in accordance with some embodiments.

FIG. 29 is a flowchart illustrating a method implemented in a communication system, in accordance with one embodiment. The communication system includes a host computer, a base station and a UE which may be those described with reference to FIGS. 15-16. For simplicity of the present disclosure, only drawing references to FIG. 29 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 30:
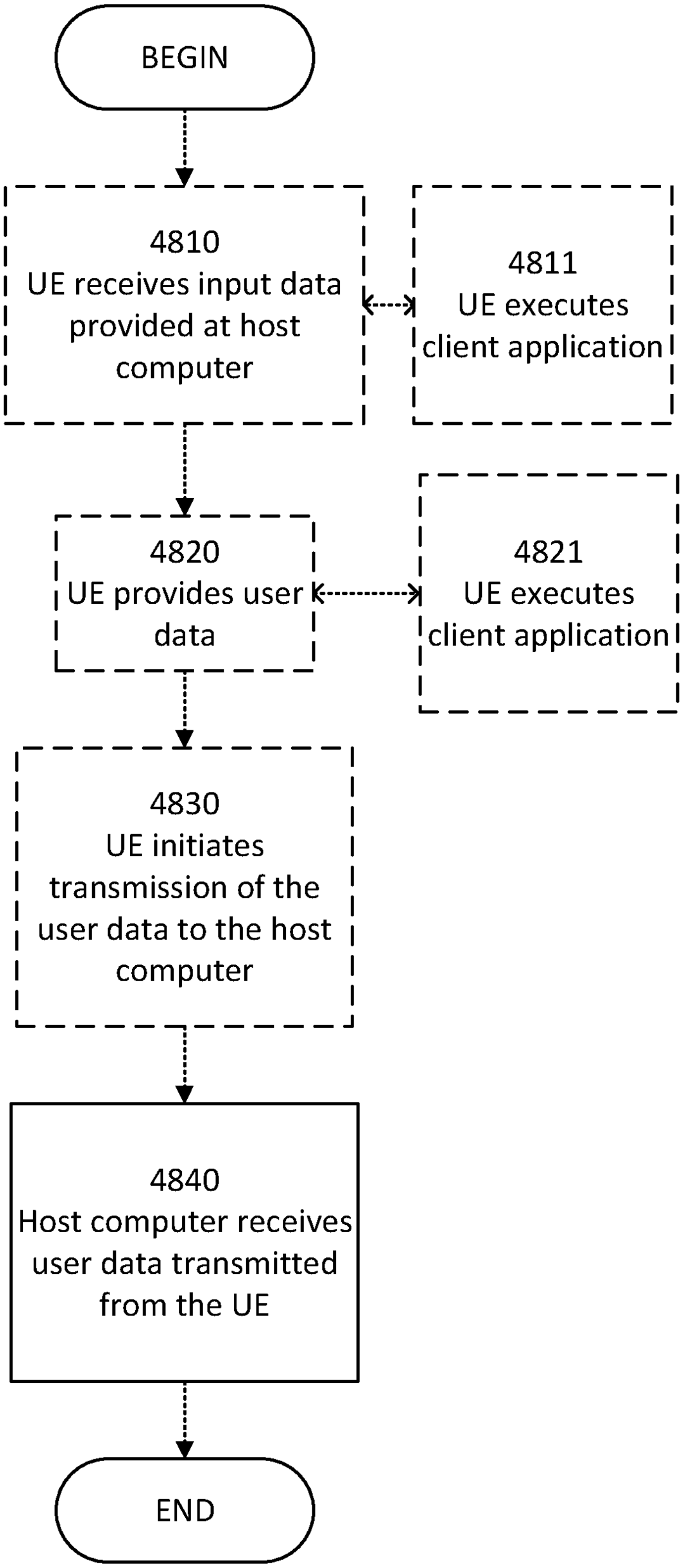
FIG. 30 is a block diagram of methods implemented in a communication system including a host computer, a base station, and a user equipment in accordance with some embodiments.

FIG. 30 illustrates methods implemented in a communication system including a host computer, a base station and a user equipment in accordance with some embodiments FIG. 30 is a flowchart illustrating a method implemented in a communication system, in accordance with one embodiment. The communication system includes a host computer, a base station and a UE which may be those described with reference to FIGS. 15-16. For simplicity of the present disclosure, only drawing references to FIG. 30 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 31:
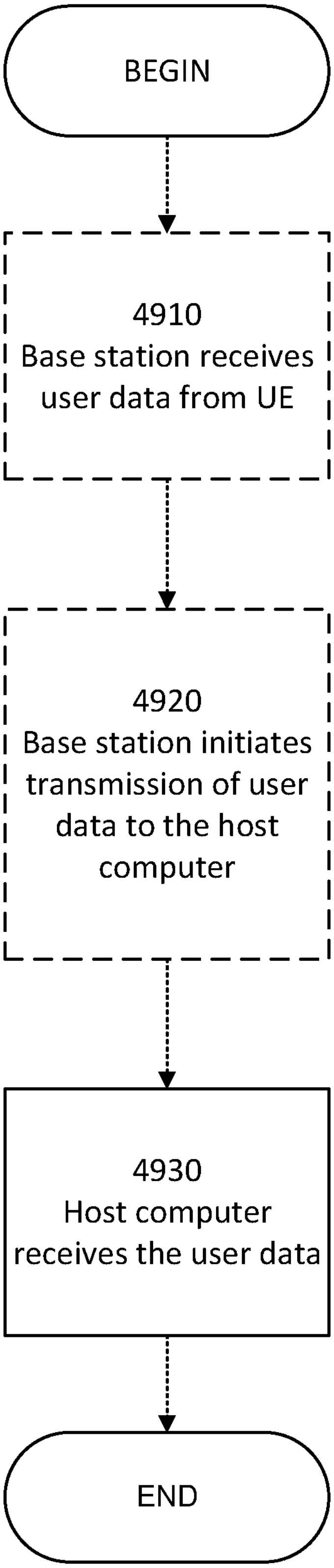
FIG. 31 is a block diagram of methods implemented in a communication system including a host computer, a base station, and a user equipment in accordance with some embodiments.

FIG. 31 illustrates methods implemented in a communication system including a host computer, a base station and a user equipment in accordance with some embodiments FIG. 31 is a flowchart illustrating a method implemented in a communication system, in accordance with one embodiment. The communication system includes a host computer, a base station and a UE which may be those described with reference to FIGS. 15-16. For simplicity of the present disclosure, only drawing references to FIG. 31 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation CC Carrier Component
CCCH SDU Common Control Channel SDU
CDMACode Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in a communications network, the method comprising:

determining, by the communication device, to transmit Msg3 information using repetition to a network node operating in the communications network during a random access, RA, procedure;

determining to use a subset of preambles that are reserved for Msg3 repetition based on determining to transmit the Msg3 information using repetition;

determining a preamble of the subset of preambles that are reserved for Msg3 repetition;

transmitting the preamble to the network node; and transmitting the Msg3 information using repetition to the network node.

2. The method of claim 1, wherein determining to transmit the Msg3 information using repetition to the network node comprises:

measuring a characteristic of a reference signal received from the network node; and determining to transmit the information to the network node using repetition based on the characteristic.

3. The method of claim 2, wherein the characteristic comprises at least one of a signal to noise ratio or a signal level.

4. The method of claim 1, wherein transmitting the Msg3 information using repetition comprises:

receiving a repetition factor in downlink control information, DCI, with cyclic redundancy check, CRC, scrambled by a temporary cell radio network temporary identifier, TC-RNTI; and transmitting the Msg3 information to the network node a number of times based on the repetition factor.

5. The method of claim 1, wherein transmitting the Msg3 information comprises transmitting the Msg3 information via a physical uplink shared channel, PUSCH.

6. The method of claim 1, wherein transmitting the Msg3 information comprises transmitting a plurality of transmissions to the network node, each transmission of the plurality transmissions conveying a same set of information bits.

7. The method of claim 6, wherein determining to transmit the Msg3 information using repetition further comprises determining to transmit the Msg3 information using repetition and frequency hopping, wherein transmitting the Msg3 information using frequency hopping comprises transmitting a first transmission and a second transmission using different frequency resources, wherein the plurality of transmissions includes the first transmission and the second transmission, and wherein transmitting the first transmission and the second transmission using different frequency resources comprises transmitting a first transmission of the plurality of transmissions using first frequency resources and transmitting a second transmission of the plurality of transmissions using second frequency resources that are different than the first frequency resources.

8. The method of claim 7, wherein transmitting the first transmission and the second transmission using different frequency resources further comprises:

determining that the first transmission and the second transmission share a hybrid automatic repeat request, HARQ, redundancy version; and determining to transmit the first transmission and the second transmission using different frequency resources based on determining that the first transmission and the second transmission share the HARQ redundancy version.

9. The method of claim 7, wherein the plurality of transmissions is a first plurality of transmissions including the first transmission, wherein the set of information bits is a first set of information bits, and wherein transmitting a first transmission and a second transmission using different frequency resources comprises transmitting each transmission of the first plurality of transmissions using a first frequency and transmitting each transmission of a second plurality of transmissions that includes the second transmission using a second frequency that is different than the first frequency, each transmission of the second plurality of transmissions conveying a same second set of information bits that are different than the first set of information bits.

10. The method of claim 7, further comprising:

receiving system information indicating a number of transmissions in the plurality of transmissions and instructions on when to change a frequency used to transmit the plurality of transmissions.

11. The method of claim 7, wherein determining to transmit the Msg3 information comprises determining to transmit the Msg3 information based on a single indicator received in a random access response, RAR, wherein the single indicator comprises an indication of a number of transmissions in the plurality of transmissions, wherein determining to transmit the Msg3 information using repetition and frequency hopping comprises:

determining that the number of transmissions is greater than one based on the bit; and determining to transmit the Msg3 information using repetition and frequency hopping based on the number being greater than one.

12. The method of claim 1, further comprising:

responsive to transmitting a portion of the Msg3 information using repetition, receiving an indication from the network node indicating to terminate repetition.

13. A method of operating a network node in a communications network, the method comprising:

receiving a preamble from a communication device during a random access, RA, procedure;

determining whether the communication device will transmit Msg3 information using repetition based on a subset of preambles associated with the preamble received from the communication device during the RA procedure, wherein the determining determines whether the preamble received from the communication device is one of the preambles in the subset of preambles that are reserved for Msg3 repetition; and receiving the Msg3 information from the communication device.

14. The method of claim 13, further comprising:

transmitting a repetition factor in downlink control information, DCI, with cyclic redundancy check, CRC, scrambled by a temporary cell radio network temporary identifier, TC-RNTI, wherein a number of times the msg3 information is received from the communication device is based on the repetition factor.

15. The method of claim 13, further comprising:

transmitting a reference signal for the communication device to use as a basis for determining whether to transmit the Msg3 information to the network node using repetition.

16. A communication device for operating in a communications network, the communication device comprising:

processing circuitry; and memory containing instructions that, when executed by the processing circuitry, cause the apparatus to:

determine to transmit Msg3 information using repetition to a network node operating in the communications network during a random access, RA, procedure;

determine to use a subset of preambles that are reserved for Msg3 repetition based on determining to transmit the Msg3 information using repetition;

determine a preamble of the subset of preambles that are reserved for Msg3 repetition;

transmit the preamble to the network node; and transmit the Msg3 information using repetition to the network node.

17. The communication device of claim 16, wherein when the instructions cause the apparatus to determine to transmit the Msg3 information using repetition to the network node, the instructions further cause the apparatus to:

measure a characteristic of a reference signal received from the network node; and determine to transmit the Msg3 information to the network node using repetition based on the characteristic.

18. The communication device of claim 17, wherein the characteristic comprises at least one of a signal to noise ratio or a signal level.

19. The communication device of claim 16, wherein when the instructions cause the apparatus to transmit the Msg3 information using repetition, the instructions further cause the apparatus to:

receive a repetition factor in downlink control information, DCI, with cyclic redundancy check, CRC, scrambled by a temporary cell radio network temporary identifier, TC-RNTI; and transmit the Msg3 information to the network node a number of times based on the repetition factor.

20. A network node for operating in a communications network, the communication device comprising:

processing circuitry; and memory containing instructions that, when executed by the processing circuitry, cause the apparatus to:

receive a preamble from a communication device during a random access, RA, procedure;

determine whether the communication device will transmit Msg3 information using repetition based on a subset of preambles associated with the preamble received from the communication device during the RA procedure, wherein the determining determines whether the preamble received from the communication device is one of the preambles in the subset of preambles that are reserved for Msg3 repetition; and receive the Msg3 information from the communication device.

21. The network node of claim 20, wherein the instructions further cause the apparatus to:

transmit a repetition factor in downlink control information, DCI, with cyclic redundancy check, CRC, scrambled by a temporary cell radio network temporary identifier, TC-RNTI, wherein a number of times the msg3 information is received from the communication device is based on the repetition factor.

22. The network node of claim 20, wherein the instructions further cause the apparatus to:

transmit a reference signal for the communication device to use as a basis for determining whether to transmit the Msg3 information to the network node using repetition.

* * * * *